US012166718B2

(12) United States Patent
Sun et al.

(10) Patent No.: US 12,166,718 B2
(45) Date of Patent: Dec. 10, 2024

(54) CHANNEL PUNCTURING

(71) Applicant: QUALCOMM Incorporated, San Diego, CA (US)

(72) Inventors: Yanjun Sun, San Diego, CA (US); Alfred Asterjadhi, San Diego, CA (US); Abhishek Pramod Patil, San Diego, CA (US); George Cherian, San Diego, CA (US); Sai Yiu Duncan Ho, San Diego, CA (US); Gaurang Naik, San Diego, CA (US); Abdel Karim Ajami, San Diego, CA (US); Sandip Homchaudhuri, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 17/455,414

(22) Filed: Nov. 17, 2021

(65) Prior Publication Data

US 2023/0155782 A1    May 18, 2023

(51) Int. Cl.
  *H04L 5/00*    (2006.01)
  *H04W 72/12*   (2023.01)
  *H04W 72/23*   (2023.01)

(52) U.S. Cl.
  CPC .......... *H04L 5/0053* (2013.01); *H04L 5/0094* (2013.01); *H04W 72/1215* (2013.01); *H04W 72/23* (2023.01)

(58) Field of Classification Search
  CPC ............ H04W 84/12; H04W 74/0816; H04W 74/0808; H04W 72/0453; H04W 72/23; H04L 5/0007; H04L 5/0048; H04L 27/2603; H04L 27/2602; Y02D 30/70
  See application file for complete search history.

(56) References Cited

U.S. PATENT DOCUMENTS

| 2012/0058772 A1* | 3/2012 | Kazmi ................. H04W 72/21 455/450 |
| 2016/0270079 A1* | 9/2016 | Seok ...................... H04L 5/0055 |
| 2016/0323426 A1* | 11/2016 | Hedayat ............ H04W 28/0268 |
| 2017/0126456 A1* | 5/2017 | Lee ....................... H04W 84/12 |

(Continued)

FOREIGN PATENT DOCUMENTS

| EP | 3 706 358 | 9/2020 |
| WO | 2020/041124 | 2/2020 |

OTHER PUBLICATIONS

International Search Report and Written Opinion dated Feb. 17, 2023 from corresponding PCT Application No. PCT/US2022/079162.

(Continued)

*Primary Examiner* — Will W Lin
(74) *Attorney, Agent, or Firm* — Arent Fox, LLP

(57) ABSTRACT

This disclosure provides methods, devices and systems for transmitting and receiving, between an access point (AP) and one or more stations (STAs) in a basic service set (BSS), an indication of a puncturing event. In some examples, the transmitting and receiving may use non-legacy elements configured to provide information about the puncturing event. In certain aspects, the disclosure provides methods for transmitting and receiving, between the AP and one or more STAs, an indication of an operating band switch. In some examples, the transmitting and receiving may use non-legacy elements configured to provide information about the operating band switch.

46 Claims, 20 Drawing Sheets

(56) References Cited

U.S. PATENT DOCUMENTS

| | | | | |
|---|---|---|---|---|
| 2018/0092032 | A1* | 3/2018 | Choi | H04W 52/0216 |
| 2018/0220443 | A1* | 8/2018 | Kim | H04W 74/06 |
| 2019/0029039 | A1* | 1/2019 | Ko | H04W 84/12 |
| 2019/0261369 | A1* | 8/2019 | Verma | H04B 7/0619 |
| 2019/0306925 | A1* | 10/2019 | Iskander | H04W 8/24 |
| 2020/0259599 | A1* | 8/2020 | Zhang | H04L 1/1864 |
| 2020/0344677 | A1* | 10/2020 | Cherian | H04W 40/244 |
| 2021/0127291 | A1 | 4/2021 | Chen et al. | |
| 2021/0185612 | A1* | 6/2021 | Song | H04W 52/0235 |
| 2021/0289506 | A1* | 9/2021 | Puranik | H04W 72/0453 |
| 2022/0085910 | A1* | 3/2022 | Sun | H04L 5/0094 |
| 2022/0416943 | A1* | 12/2022 | Jang | H04L 1/0069 |
| 2024/0064837 | A1* | 2/2024 | Kim | H04W 76/14 |

OTHER PUBLICATIONS

Yanjun Sun (Qualcomm): "CR for 35.2.1.2 preamble puncturing", IEEE Draft; 11-21-0455-08-00BE-CR-FOR-35-2-I-2-PREAMBLE-PUNCTURING, IEEE-SA Mentor, Piscataway, NJ USA; vol. 802. 11 EHT; 802.11be, No. 8, Jun. 29, 2021 (Jun. 29, 2021), pp. 1-11, XP068182255, Retrieved from the Internet: URL:https://mentor.ieee.org/802.11/dcn/21/11-21-0455-08-00be-cr-for-35-2-1-2-preamble-puncturing.docx [retrieved on Jun. 29, 2021].

11 35. Extremel.y high throughput (EHT) MAC specification, IEEE Draft; TGBE_CL_35, IEEE-SA, Piscataway, NJ USA; vol. 802.11be drafts, No. D1.1, Jul. 23, 2021 (Jul. 23, 2021), pp. 1-86, XP068183930, Retrieved from the Internet: URL:http://grouper.ieee.org/groups/802/11/private/Draft_Standards/11be/Draft%20P802.11be_D1.1%20-%20Word.zip TGbe_Cl._ 35.doc [retrieved on Jul. 23, 2021].

\* cited by examiner

CHANNEL PUNCTURING

TECHNICAL FIELD

This disclosure relates generally to wireless communication, and more specifically, to signaling an indication of channel puncturing.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN. With increasing demand for bandwidth intensive applications, new protocols and technologies are being developed to improve the performance or the reliability of WLAN communications. With new designs being implemented in WLAN communications, improvements in signaling are desirable.

SUMMARY

The systems, methods and devices of this disclosure each have several innovative aspects, no single one of which is solely responsible for the desirable attributes disclosed herein.

Certain aspects relate to an apparatus for wireless communications, comprising a memory comprising instructions, and one or more processors configured to execute the instructions. In some examples, the instructions cause the apparatus to output data for transmission to one or more stations (STAs) in a basic service set (BSS) via a first operating band comprising at least a first subchannel. In some examples, the instructions cause the apparatus to determine a puncturing event starting in the future, the puncturing event being associated with the first subchannel. In some examples, the instructions cause the apparatus to output, for transmission prior to the start of the puncturing event, at least one management frame to the one or more STAs, wherein the at least one management frame comprises a non-legacy element configured to indicate the puncturing event and the first subchannel. In some examples, the instructions cause the apparatus to refrain from outputting data for transmission to the one or more STAs via the first subchannel upon the start of the puncturing event.

Certain aspects relate to a method for wireless communications at an access point (AP). In some examples, the method includes outputting data for transmission to one or more stations (STAs) in a basic service set (BSS) via a first operating band comprising at least a first subchannel. In some examples, the method includes determining a puncturing event starting in the future, the puncturing event being associated with the first subchannel. In some examples, the method includes outputting, for transmission prior to the start of the puncturing event, at least one management frame to the one or more STAs, wherein the at least one management frame comprises a non-legacy element configured to indicate the puncturing event and the first subchannel. In some examples, the method includes refraining from outputting data for transmission to the one or more STAs via the first subchannel upon the start of the puncturing event.

Certain aspects relate to an apparatus for wireless communications. In some examples, the apparatus includes means for outputting data for transmission to one or more stations (STAs) in a basic service set (BSS) via a first operating band comprising at least a first subchannel. In some examples, the apparatus includes means for determining a puncturing event starting in the future, the puncturing event being associated with the first subchannel. In some examples, the apparatus includes means for outputting, for transmission prior to the start of the puncturing event, at least one management frame to the one or more STAs, wherein the at least one management frame comprises a non-legacy element configured to indicate the puncturing event and the first subchannel. In some examples, the apparatus includes means for refraining from outputting data for transmission to the one or more STAs via the first subchannel upon the start of the puncturing event.

Certain aspects relate to a non-transitory computer-readable medium having instructions stored thereon that, when executed by a wireless device, cause the wireless device to perform operations. In some examples, the operations include outputting data for transmission to one or more stations (STAs) in a basic service set (BSS) via a first operating band comprising at least a first subchannel. In some examples, the operations include determining a puncturing event starting in the future, the puncturing event being associated with the first subchannel. In some examples, the operations include outputting, for transmission prior to the start of the puncturing event, at least one management frame to the one or more STAs, wherein the at least one management frame comprises a non-legacy element configured to indicate the puncturing event and the first subchannel. In some examples, the operations include refraining from outputting data for transmission to the one or more STAs via the first subchannel upon the start of the puncturing event.

Certain aspects relate to an apparatus for wireless communications, comprising a memory comprising instructions and one or more processors configured to execute the instructions. In some examples, the instructions are configured to cause the apparatus to obtain, from an access point (AP) prior to a start of a puncturing event, at least one management frame comprising a non-legacy element configured to indicate the puncturing event and a first subchannel of a plurality of subchannels of a first operating band used by the apparatus for communication with the AP in a basic service set (BSS). In some examples, the instructions are configured to cause the apparatus to refrain from outputting data for transmission to the AP via the first subchannel upon the start of the puncturing event.

Certain aspects relate to a method for wireless communications at a station (STA). In some examples, the method includes obtaining, from an access point (AP) prior to a start of a puncturing event, at least one management frame comprising a non-legacy element configured to indicate the puncturing event and a first subchannel of a plurality of subchannels of a first operating band used by the STA for communication with the AP in a basic service set (BSS). In some examples, the method includes refraining from outputting data for transmission to the AP via the first subchannel upon the start of the puncturing event.

Certain aspects relate to an apparatus for wireless communications. In some examples, the apparatus includes means for obtaining, from an access point (AP) prior to a start of a puncturing event, at least one management frame comprising a non-legacy element configured to indicate the puncturing event and a first subchannel of a plurality of subchannels of a first operating band used by the apparatus for communication with the AP in a basic service set (BSS). In some examples, the apparatus includes means for refraining from outputting data for transmission to the AP via the first subchannel upon the start of the puncturing event.

Certain aspects relate to a non-transitory computer-readable medium having instructions stored thereon that, when executed by a wireless device, cause the wireless device to perform operations. In some examples, the operations include obtaining, from an access point (AP) prior to a start of a puncturing event, at least one management frame comprising a non-legacy element configured to indicate the puncturing event and a first subchannel of a plurality of subchannels of a first operating band used by the wireless device for communication with the AP in a basic service set (BSS). In some examples, the operations include refraining from outputting data for transmission to the AP via the first subchannel upon the start of the puncturing event.

Certain aspects relate to an apparatus for wireless communications, comprising a memory comprising instructions and one or more processors configured to execute the instructions. In some examples, the instructions cause the apparatus to determine to switch from a first operating band to a second operating band, the first operating band used by the apparatus to communicate with one or more stations (STAs) in a basic service set (BSS). In some examples, the instructions cause the apparatus to output, for transmission to the one or more STAs via the first operating band prior to the switch, a first indication related to the switch from the first operating band to the second operating band. In some examples, the instructions cause the apparatus to switch to the second operating band. In some examples, the instructions cause the apparatus to obtain, from each of the one or more STAs via the second operating band, information indicating a second operating band capability of the corresponding one or more STAs.

Certain aspects relate to a method of wireless communication at an access point (AP). In some examples, the method includes determining to switch from a first operating band to a second operating band, the first operating band used by the AP to communicate with one or more stations (STAs) in a basic service set (BSS). In some examples, the method includes outputting, for transmission to the one or more STAs via the first operating band prior to the switch, a first indication related to the switch from the first operating band to the second operating band. In some examples, the method includes switching to the second operating band. In some examples, the method includes obtaining, from each of the one or more STAs via the second operating band, information indicating a second operating band capability of the corresponding one or more STAs.

Certain aspects relate to an apparatus for wireless communication. In some examples, the apparatus includes means for determining to switch from a first operating band to a second operating band, the first operating band used by the AP to communicate with one or more stations (STAs) in a basic service set (BSS). In some examples, the apparatus includes means for outputting, for transmission to the one or more STAs via the first operating band prior to the switch, a first indication related to the switch from the first operating band to the second operating band. In some examples, the apparatus includes means for switching to the second operating band. In some examples, the apparatus includes means for obtaining, from each of the one or more STAs via the second operating band, information indicating a second operating band capability of the corresponding one or more STAs.

A non-transitory computer-readable medium having instructions stored thereon that, when executed by a wireless device, cause the wireless device to perform operations. In some examples, the operations include determining to switch from a first operating band to a second operating band, the first operating band used by the wireless device to communicate with one or more stations (STAs) in a basic service set (BSS). In some examples, the operations include outputting, for transmission to the one or more STAs via the first operating band prior to the switch, a first indication related to the switch from the first operating band to the second operating band. In some examples, the operations include switching to the second operating band. In some examples, the operations include obtaining, from each of the one or more STAs via the second operating band, information indicating a second operating band capability of the corresponding one or more STAs.

Certain aspects relate to an apparatus for wireless communications, comprising a memory comprising instructions and one or more processors configured to execute the instructions. In some examples, the instructions are configured to cause the apparatus to obtain, from an access point (AP) via a first operating band, a first indication related to a switch from the first operating band to a second operating band, the first operating band used by the apparatus for communication within a basic service set (BSS). In some examples, the instructions are configured to cause the apparatus to output, for transmission to the AP via the second operating band, information indicating a second operating band capability of the apparatus.

Certain aspects relate to a method for wireless communications at a station (STA). In some examples, the method includes obtaining, from an access point (AP) via a first operating band, a first indication related to a switch from the first operating band to a second operating band, the first operating band used by the STA for communication within a basic service set (BSS). In some examples, the method includes outputting, for transmission to the AP via the second operating band, information indicating a second operating band capability of the apparatus.

Certain aspects relate to an apparatus for wireless communications. In some examples, the apparatus includes means for obtaining, from an access point (AP) via a first operating band, a first indication related to a switch from the first operating band to a second operating band, the first operating band used by the apparatus for communication within a basic service set (BSS). In some examples, the apparatus includes means for outputting, for transmission to the AP via the second operating band, information indicating a second operating band capability of the apparatus.

Certain aspects relate to a non-transitory computer-readable medium having instructions stored thereon that, when executed by a wireless device, cause the wireless device to perform operations. In some examples, the operations include obtaining, from an access point (AP) via a first operating band, a first indication related to a switch from the first operating band to a second operating band, the first operating band used by the wireless device for communication within a basic service set (BSS). In some examples, the operations include outputting, for transmission to the AP via the second operating band, information indicating a second operating band capability of the apparatus.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
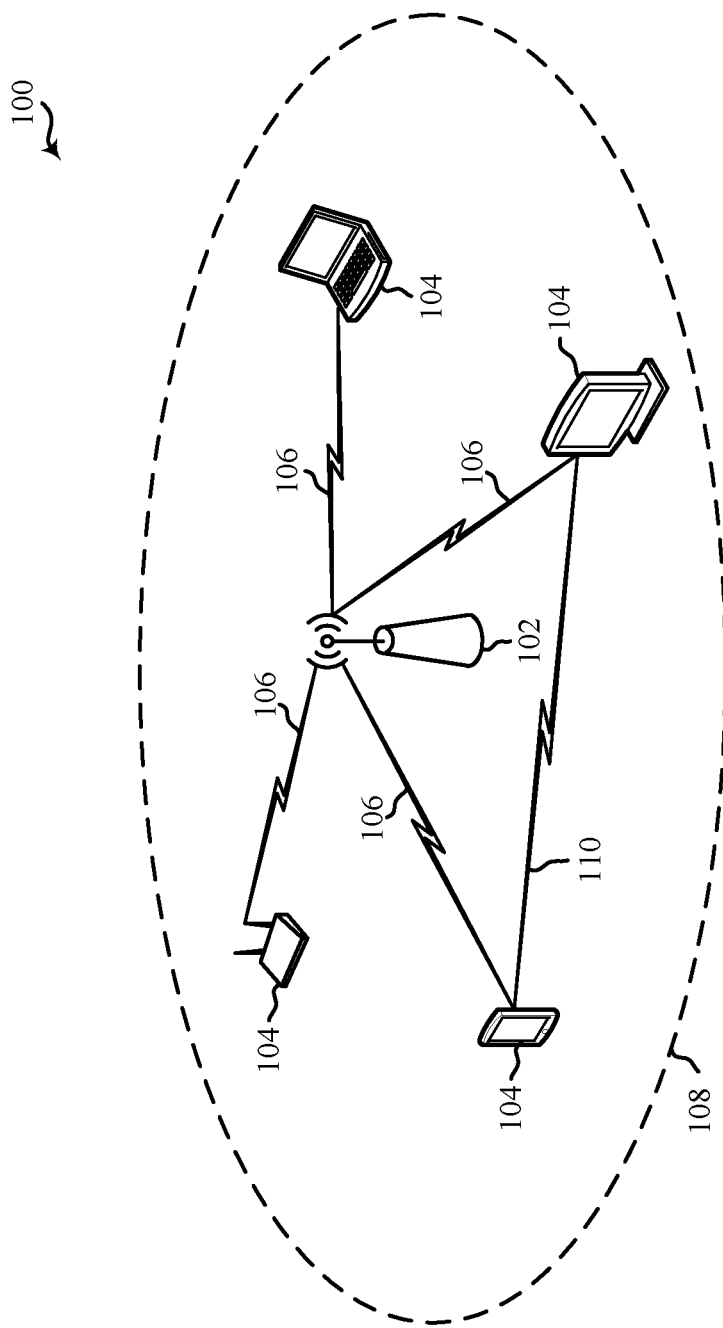
FIG. 1 is a pictorial diagram illustrating an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the $3^{rd}$ Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU)-MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Signaling refers to control fields or information that can be used by a wireless communication device to interpret another field or portion of a packet. For some wireless communication techniques, such as orthogonal frequency division multiple access (OFDMA), a wireless channel may utilize multiple subchannels that can be divided or grouped in a transmission to form different resource units (RUs). The signaling can indicate which RUs include data for a particular recipient. Additionally or alternatively, signaling may be required for multiple-user (MU) multiple-input multiple-output wireless communications. Other types of signaling include indicators regarding which subchannels carry further signaling or which subchannels are punctured. Still further, some signaling can indicate the lengths of one or more fields or subfields in the data packet. As new wireless communication protocols enable enhanced features, new preamble designs are needed to support signaling regarding the new features and packet formats.

Various aspects of the present disclosure relate generally to signaling included broadcast, multicast, or unicast transmissions that support new wireless communication protocols indicating puncturing of one or more channels in an operating band used for communication within a basic service set (BSS). For example, such communication protocols may include Extremely High Throughput (EHT) operation as defined in the IEEE 802.11be amendment, as well as future generals of the IEEE 802.11 family of standards.

In one example, a first access point (AP) communicating with one or more stations (STAs) in a BSS may communicate over an operating band comprising multiple subchannels (e.g., 20 MHz subchannels). However, if a second AP or a non-WiFi device needs additional subchannel resources, the first AP may end communications on one of the multiple subchannels so that the second AP can use it. As used herein, a "punctured" subchannel relates to a subchannel, within the operating band, over which the first AP and corresponding STAs of the BSS will not use to transmit or receive signaling. This is so that the second AP or the non-WiFi device can use the subchannel for a period of time. However, a subchannel may also be punctured for any other reason, including if one or more of the first AP or STAs determine that the subchannel quality has degraded due to interference or the like.

In some examples, the first AP may notify its BSS (e.g., the one or more STAs) of a puncturing event (e.g., that a particular subchannel within the operating band is being punctured at a particular time). The notification may be sent to inform the STAs of when the puncturing will occur and to prevent the STAs from using the subchannel after it has been punctured. In some examples, the AP may transmit an indication of the puncturing event and the subchannel being punctured to the one or more STAs via a multi-bit bitmap. Each bit of the bitmap may correspond to a particular one of the multiple subchannels of the operating band or channel. For example, if the operating band includes 16 subchannels, the bitmap may include 16 bits, wherein each of the 16 bits is representative of one of the 16 subchannels. Here, the AP can set a corresponding bit in the bitmap to a "1" and send the bitmap to the STAs so that the STAs refrain from using the subchannel that corresponds to the set bit. The AP may transmit the bitmap to the STAs in a management frame (e.g., a beacon frame, an action frame, a probe response frame (including unsolicited probe response frame), a (re) association response frame (e.g., an association or reassociation frame), etc.).

However, problems may arise when the AP tries to notify its BSS of the puncturing. For example, the transmitted indication of the puncturing event may not reach the one or more STAs if the STAs are in a power saving (PS) mode, if there is interference (e.g., degraded channel condition) that prevents an STA from properly decoding the indication, etc. Consequently, if a first STA is not informed of a latest puncturing event, the first STA will likely continue to communicate over a subchannel after the subchannel has been punctured. Consequently, the continued use of the subchannel may can cause interference, signal degradation, and packet error from collision with other packets transmitted by another device that is legitimately using the punctured subchannel. Moreover, to the extent the subchannel is punctured, any device that is an intended recipient of a transmission by the first STA may not be listening to the punctured subchannel, which may result in degraded communications and packet error.

Thus, aspects of the disclosure are directed to reliably transmitting, from an AP, an indication of a puncturing event to other devices (e.g., other APs and/or STAs). In some examples, the AP may transmit one or more beacon frames and/or one or more action frames carrying the indication of the puncturing event to the other devices prior to the puncturing event. In one example scenario, the AP may transmit the indication via multiple beacon frames, at periodic intervals prior to the puncturing event. Here, by transmitting the indication of the puncturing event multiple times, there is a greater likelihood that all the STAs in the BSS will receive the indication, thereby reducing the likelihood that any of the STA will continue to transmit over the punctured subchannel.

In another example scenario, the AP may transmit the indication via one or more action frames, at dynamic intervals prior to, or after, the puncturing event. For example, the AP may listen to the punctured subchannel for a period of time after the puncturing event to determine whether any of the STAs in the BSS are continuing to transmit over the punctured subchannel. If an STA is still transmitting over the punctured channel, the AP may transmit an action frame (e.g., unicast) to the STA so that the STA stops using the punctured subchannel for future transmissions. Moreover, because a beacon frame can only be sent at pre-configured beacon intervals, transmitting an action frame may reduce latency because action frame can be sent anytime. For example, if puncturing is scheduled to happen prior to the next beacon interval (e.g., not enough time for multiple beacons before puncturing), the AP may rely instead on the action frame.

In some examples, a transmission comprising the indication of the puncturing event may include an indication of a time that the puncturing event will start. For example, the AP may transmit a management frame comprising the indication of the puncturing event (e.g., including the bitmap identifying the subchannel to be punctured) and an integer value indicative of a number of time window(s) (e.g., target beacon transmit times (TBTTs) such as beacon intervals, or any other suitable time unit (TU)) or a duration of time that must pass before the puncturing event. For example, an integer value of "1" may indicate that use the subchannel to be punctured may end at the next TBTT, which indicates the start of the puncturing event for the subchannel. Accordingly, at the next TBTT, the AP and STAs may begin communicating over the operating band according to the puncturing pattern provided by the bitmap (e.g., using all other subchannels not punctured in the operating band).

Certain aspects of the disclosure relate to new (e.g., non-legacy) elements (e.g., frames, fields, information elements, etc.) for communicating an indication of a puncturing event, as well as other elements such as timing or countdown information. Certain aspects relate to non-legacy elements used in legacy frames. A non-legacy element may include one or more non-legacy fields, for example, conforming to an IEEE wireless communication protocol such as the 802.11be or later wireless communication protocols.

In certain aspects, an AP may transmit puncturing event information to the STAs via one or more of a physical (PHY) layer header or a medium access control (MAC) header of a PPDU. For example, the AP may use the PHY header or the MAC header to indicate a particular subchannel subject to a puncturing event. In this example, the STA refrains from transmitting over the indicated subchannel in subsequent frame exchanges in response to the PPDU.

In certain aspects, an STA may not receive an indication of a puncturing event from the AP despite one or more subchannels being punctured. In such a case, the STA may continue to listen to the one or more punctured subchannels for valid symbols transmitted by the AP. If no valid symbols are detected, and/or a detected energy level of the one or more punctured subchannels falls below a preconfigured threshold, the STA may determine that the subchannel is punctured.

As discussed, an AP may communicate with one or more STAs in a BSS over an operating band comprising multiple subchannels. While the above discusses scenarios for continuing to communicate over the same operating band when one or more of the multiple subchannels are punctured, certain aspects of the disclosure are directed to techniques for switching from a first operating band (e.g., a first plurality of subchannels) to a second operating band (e.g., a second plurality of subchannels). For example, if the AP detects sufficient channel degradation or noise over the first operating band, the AP may determine to switch to the second operating band. An operating band may include a 2.4 GHz band, a 5 GHz band, a 6 GHz band, or any other suitable band for BSS communication.

However, each operating band (2.4 GHz, 5 GHz, 6 GHz) may require a different set of capabilities of the AP and/or STAs for communication thereon. The STA may indicate its capabilities to the AP via a reassociation request, but reassociation at the new operating band may purge all existing associations (e.g., security context, block acknowledgement (ACK) context, and any other state machines or associations that the STA is maintaining) between the AP and the STA. Thus, a smoother, more seamless transition may enhance BSS communications.

In one example, an STA may perform the switch from the first operating band to the second operating band with the AP. However, if the communication capabilities of the STA are not aligned with the capabilities required to communicate on the second operating band (e.g., the capabilities of the first operating band are different from the capabilities of the second operating band, or the capabilities of the second operating band were not advertised on the first operating band), then the STA may transmit a probe request frame to the AP using the second operating band. In some examples, the probe request frame indicates its capabilities to the AP. However, in some examples, when the AP switches to the new operating band, a probe storm may result when multiple STAs simultaneously transmit probe requests to the AP. Thus, to prevent packet error and signal collision issues caused by a probe storm, the AP may use one or more of the following techniques.

In a first technique, the AP may increase an enhanced distributed channel access (EDCA) parameter to provide a longer contention window (CW) on the new operating band so that the multiple STAs have a longer period of time to switch to the new operating band. The AP may advertise the increased EDCA to the STAs prior to switching to the second operating band (e.g., over the first operating band), after switching to the second operating band (e.g., over the second operating band), or both (e.g., advertise over the first operating band prior to the switch, and advertise over the second operating band after the switch).

In a second technique, the AP may transmit a trigger frame to one or more STAs to solicit probe requests from the one or more STAs at different times to prevent a probe storm. Each trigger frame may address one or more STAs through a respective association identifier (AID), and may schedule each AID (and thus each STA) one or more resource units (RUs) that can be used by the corresponding STA to send the probe request to the AP. In some examples, the AP, before switching from the first operating band to the second operating band, may transmit an indication of the operating band switch (e.g., via management frame) wherein the indication comprises a field indicating whether the AP will transmit trigger frames to the STAs over the second operating band after the switch. The set field may be configured to prevent the STAs from transmitting a probe request to the AP after switching to the second operating band.

In a third technique, the AP, before switching from the first operating band to the second operating band, may transmit an indication of the operating band switch (e.g., via management frame). In response to the indication of the switch, the STAs may determine a backoff period (e.g., an amount of time) that the respective STA may wait after the switch to the second operating band before transmitting a probe request to the AP. Thus, because each STA determines a backoff period, the likelihood of collision due to probe storm is reduced because the STAs may all transmit probe requests at different times.

In some examples, one or more STAs may randomly generate a backoff period based on a size of the CW. For example, the AP may provide the STAs with EDCA parameters indicating the duration of the CW. In response, each STA may generate a random backoff period falling between the time of the switch to the second operating band and the end of the CW. In some examples, the AP may preconfigure one or more STAs with a backoff period via a management frame transmitted over the first operating band and/or the second operating band. It should be noted that one or more of the first technique, the second technique and the third technique may be used by the AP and STAs to prevent a probe storm after switching to a new operating band.

FIG. 1 is a network schematic illustrating an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-channels or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2:
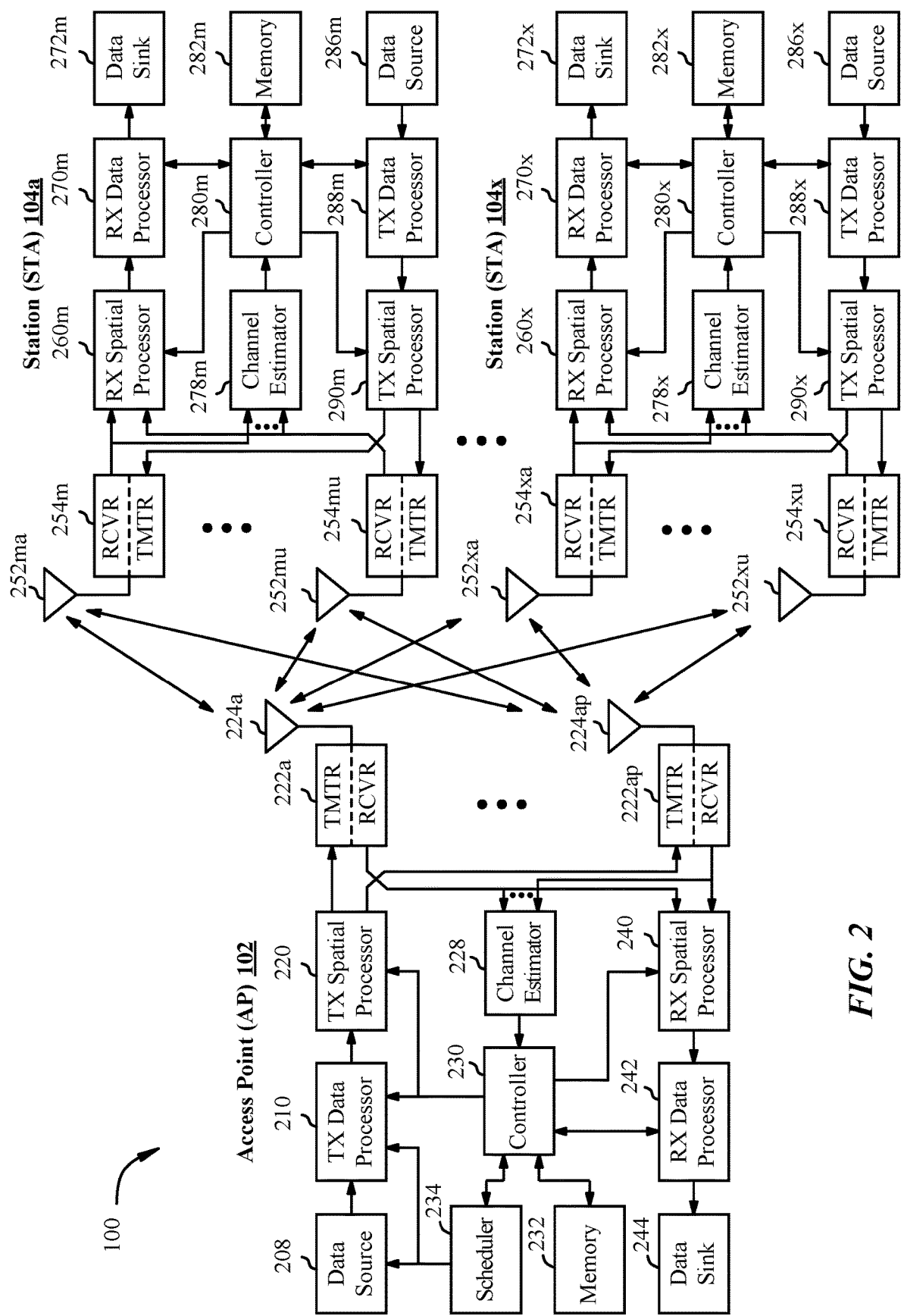
FIG. 2 is a diagram illustrating hardware aspects of an access point and two stations.

FIG. 2 illustrates a block diagram of an AP 102 and two STAs 104a and 104x in a BSS. The AP 102 is equipped with $N_t$ antennas 224a through 224t. STA 120m is equipped with $N_{ut,m}$ antennas 252ma through 252mu, and STA 120x is equipped with $N_{ut,x}$ antennas 252xa through 252xu. The AP 102 is a transmitting entity for the downlink and a receiving entity for the uplink. Each STA 104 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval.

The beam-steering or some other spatial processing technique may be used at the access point and user terminal.

On the uplink, at each STA 104 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the AP 102.

$N_{up}$ STAs may be scheduled for simultaneous transmission on the uplink. Each of these STAs performs spatial processing on its data symbol stream and transmits its set of transmit symbol streams on the uplink to the AP 102.

At the AP 102, $N_{ap}$ antennas 224a through 224ap receive the uplink signals from all $N_{up}$ STAs transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective STA. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at AP 102, a TX data processor 210 receives traffic data from a data source 208 for $N_{dn}$ STA scheduled for downlink transmission, control data from a controller 230, and possibly other data from a scheduler 234. The various types of data may be sent on different transport channels. TX data processor 210 processes (e.g., encodes, interleaves, and modulates) the traffic data for each STA based on the rate selected for that STA. TX data processor 210 provides $N_{dn}$ downlink data symbol streams for the $N_{dn}$ STA. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the STA.

At each STA 120, $N_{ut,m}$ antennas 252 receive the $N_{ap}$ downlink signals from AP 102. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the STA. The receiver spatial processing is performed in accordance with the CCMI, MMSE or some other technique. An RX data processor 270 processes (e.g., demodulates, deinterleaves and decodes) the recovered downlink data symbol stream to obtain decoded data for the STA.

At each STA 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each STA typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each STA may send feedback information (e.g., the downlink and/or uplink eigenvectors, eigenvalues, SNR estimates, and so on) to the access point. Controllers 230 and 280 also control the operation of various processing units at AP 102 and STA 104, respectively.

Figure 3:
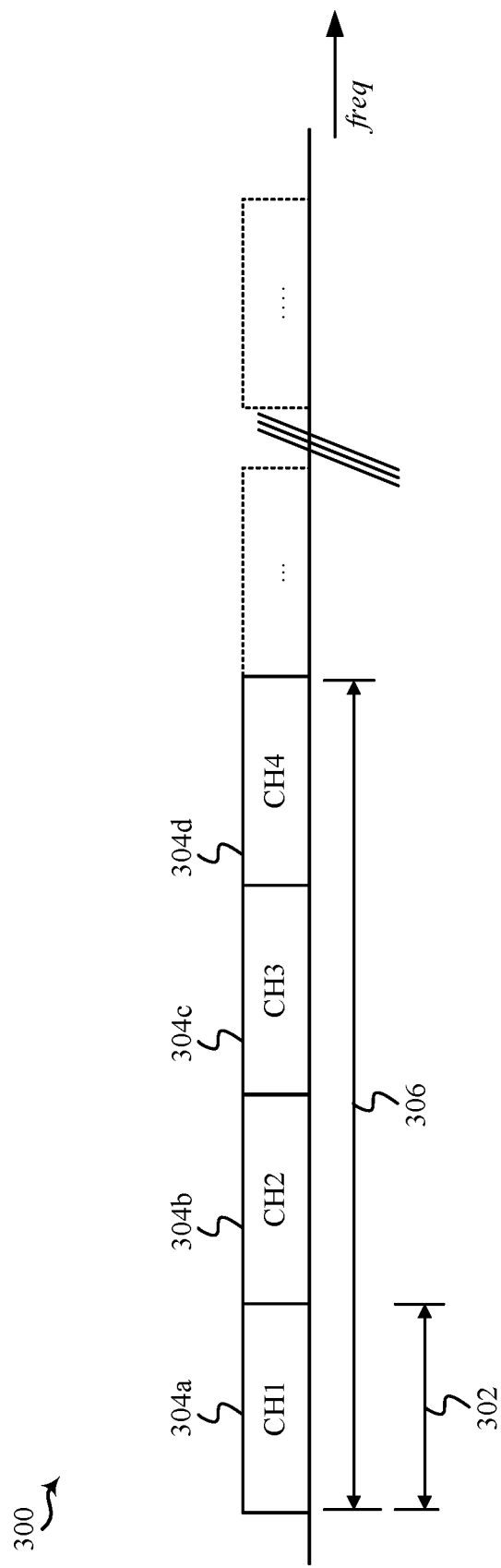
FIG. 3 is a channel map illustrating an example bonded wireless channel (e.g., an operating band).

FIG. 3 is a channel map 300 illustrating an example bonded wireless channel (e.g., an operating band 306) that includes a group of four subchannels (e.g., a first subchannel 304a, a second subchannel 304b, a third subchannel 304c, and a fourth subchannel 304d—collectively referred to as "subchannels 304"). In this example, a channel map for a frequency band (such as the 2.5 GHz, 5 GHz or 6 GHz frequency bands) may define the multiple subchannels 304. Each subchannel 304 has a uniform channel width 302 (e.g., 20 MHz, 40 MHz, or 80 MHz, among other examples). Some WLAN devices (e.g., APs and STAs) are capable of transmitting at higher bandwidths using a wireless channel that is made up of multiple channels (which may be referred to as subchannels when used as part of a larger wireless channel). In the example of FIG. 3, the operating band 306 may be used to transmit an 80 MHz transmission by bonding together the four subchannels. Although illustrated as contiguous subchannels in the channel map 300, in some implementations, the operating band 306 may contain subchannels 304 which are not adjacent in the channel map 300. Additionally, larger groups of subchannels 304 may be used in some implementations. For example, IEEE 802.11ax provides for the use of 8 subchannels, and later versions of IEEE 802.11 may provide for the use of 16 (or more) subchannels for higher bandwidth transmissions. In certain aspects, smaller groups of subchannels 304 may be used, for example, if multiple subchannels in a group are punctured.

Examples of Subchannel Puncturing

Figure 4:
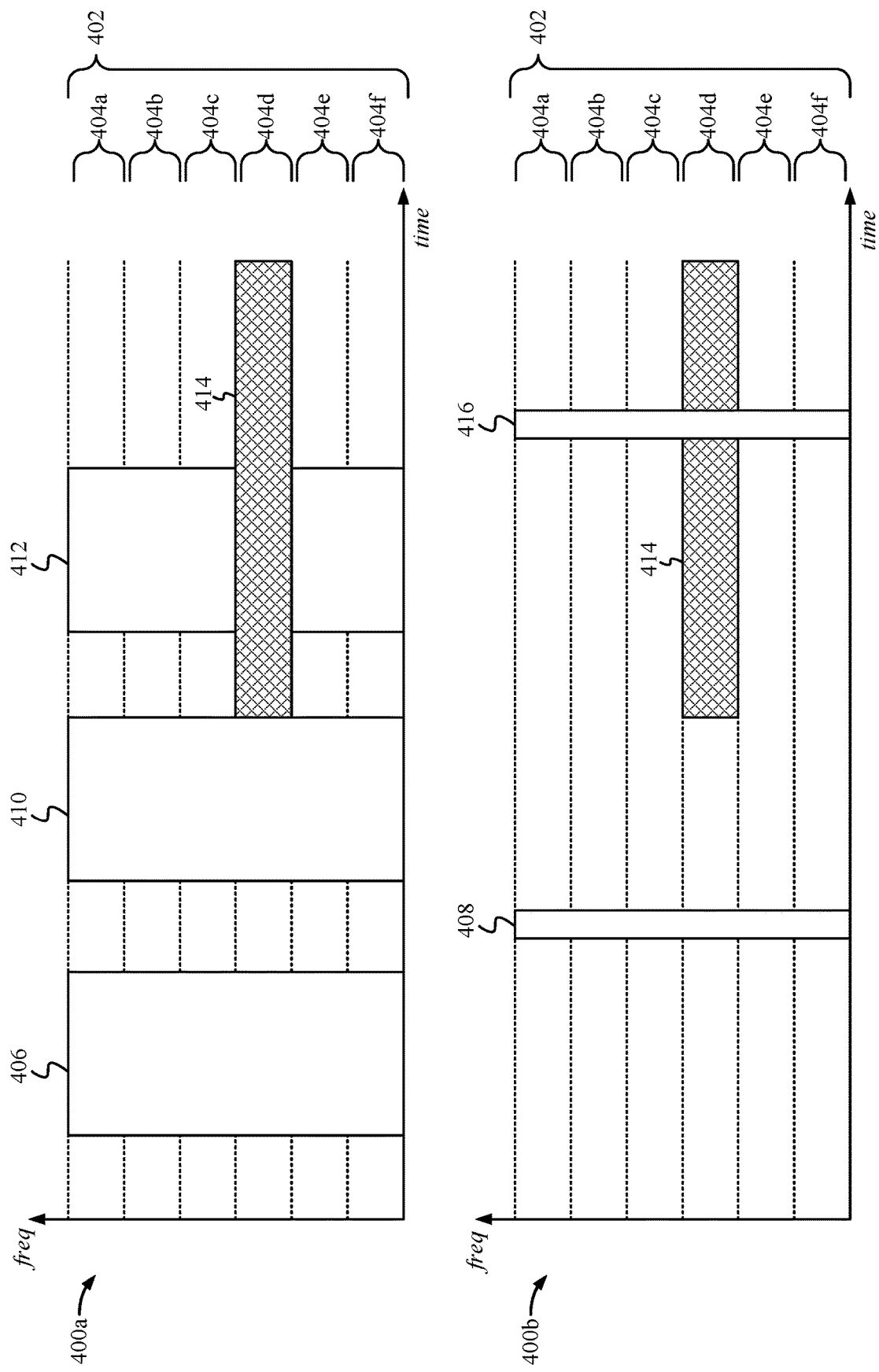
FIG. 4 is a schematic illustrating a conceptual time-based illustration of an example punctured transmission in a basic service set (BSS) environment.

FIG. 4 is a schematic illustrating a conceptual time-based illustration of an example punctured transmission in a basic service set (BSS) environment. FIG. 4 includes a first time-based communication diagram 400a showing transmissions by an AP (e.g., AP 102 of FIG. 1) over an operating band 402, and a second time-based communication diagram 400b showing transmissions by an STA (e.g., STA 104 of FIG. 1) over the same operating band 402. The AP and the STA may transmit and receive communications using the operating band 402 which includes six bonded subchannels 404a-f.

In this example, the AP may transmit a first data signal 406 to the STA, and the STA may transmit a first block acknowledgment (ACK) 408 in response to receiving the first data signal 406. Next, the AP may determine a puncturing event 414 to take place in the future. For example, another AP or wireless device may notify the AP that it requires additional wireless resources for communication. In this example, the AP may provide the other device with an indication of a particular subchannel that the other device may use for transmitting and receiving data.

Accordingly, the AP may transmit (e.g., broadcast) a management frame 410 to the BSS, including the STA, wherein the management frame includes a field configured to indicate the puncturing event and the subchannel being punctured. In this example, the management frame indicates that a fourth subchannel 404d will be punctured. However, as illustrated, the STA does not receive the management frame 410, and therefore, is not aware of the puncturing event. The AP then transmits a second data signal 412 over the operating band 402 using all the subchannels with the exception of the fourth subchannel 404d. Here, because the fourth subchannel 404d has been punctured by another device, the AP and its BSS may refrain from transmitting over the fourth subchannel 404d and/or listening to signaling transmitted over the fourth subchannel 404d. Thus, a puncturing pattern of the operating band 402 is defined by a punctured fourth subchannel 404d, and five remaining subchannels (e.g., a first subchannel 404a, a second subchannel 404b, a third subchannel 404c, a fifth subchannel 404e, and a sixth subchannel 404f) of the operating band 402 that will continue to be used for communication.

However, because the STA did not receive the management frame 410, the STA may respond with a second block ACK 416 using all the subchannels 404a-f the operating band 402. By transmitting over the punctured fourth subchannel 404d, the second block ACK may interfere with communications by the other device using the fourth subchannel 404d. Moreover, because the AP is not listening to the fourth subchannel, any transmissions by the STA over the fourth subchannel 404d may not be received by the AP. As such, those communications may suffer from packet error due to the entire transmission not being received at the AP. Accordingly, techniques for efficiently and reliably updating the BSS of puncturing patterns may prevent communication collisions and errors between the AP and STA.

Example Techniques for Notifying and Updating Puncturing Patterns in a BSS

Figure 5:
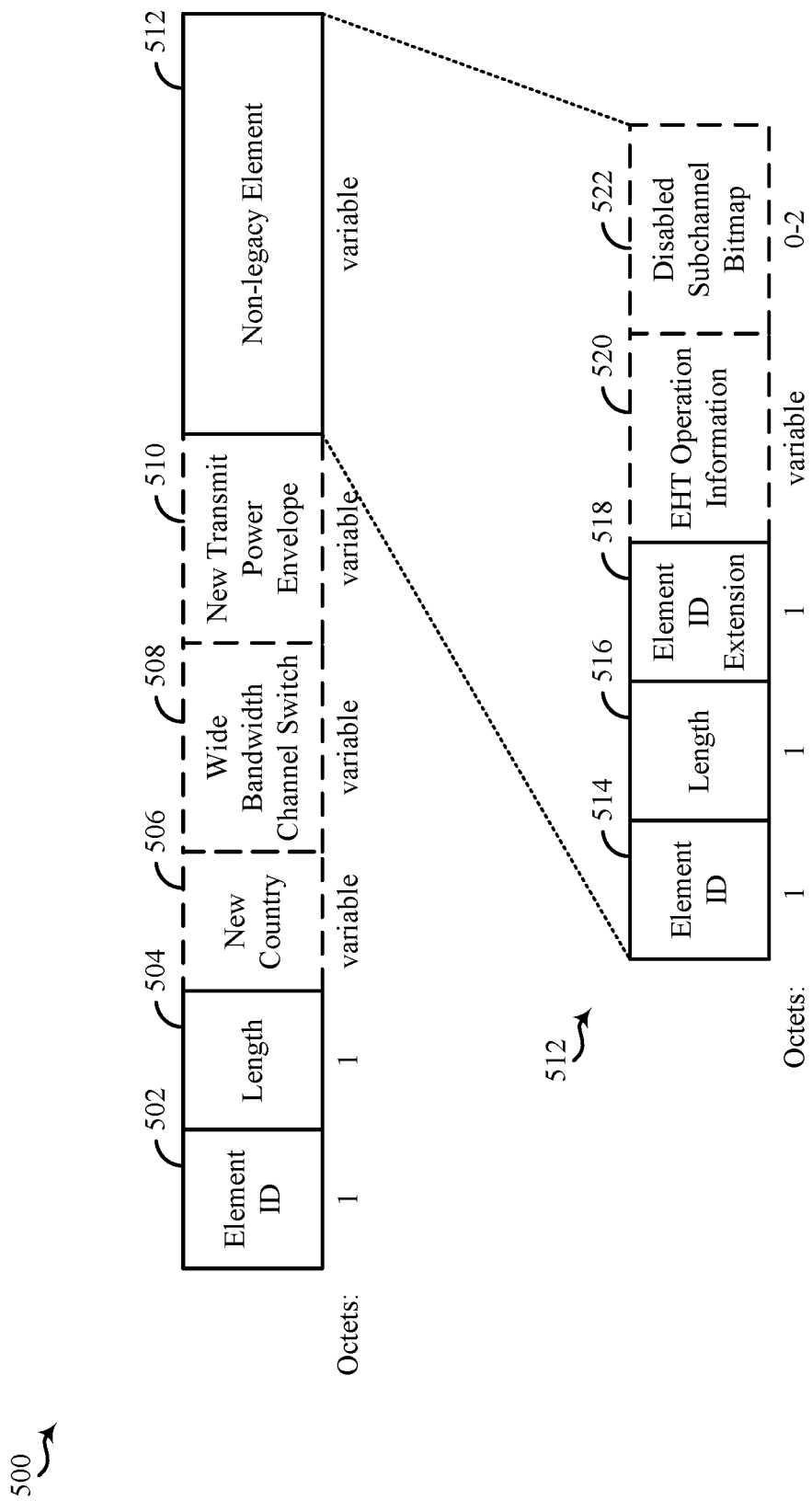
FIG. 5 is a block diagram illustrating a legacy information element (IE) (e.g., a channel switch wrapper IE) that includes a non-legacy element.

FIG. 5 is a block diagram illustrating a legacy information element (IE) 500 (e.g., a channel switch wrapper IE) that includes a non-legacy element 512. The legacy IE 500 may be formatted as an extreme high throughput (EHT) WLAN IE in accordance with the IEEE 802.11be amendment to the IEEE 802.11 wireless communication protocol standard, or may be formatted as an IE conforming to any later (post-EHT) version of a new wireless communication protocol conforming to a future IEEE 802.11 wireless communication protocol standard or other wireless communication standard. In some implementations, the legacy IE 500 may carry information in one or more 20 MHz subchannels of an operating band (e.g., the operating band 402 illustrated in FIG. 4).

The legacy IE 500 includes several legacy elements (e.g., an element ID 502, a length 504, and optional legacy elements including: a new country 506, a wide bandwidth channel switch 508, a new transmit power envelope 510). The non-legacy element 512 of the IE 500 may include an element ID 514, a length 516, an element ID extension 518, and may optionally include EHT operation information 520, and a disabled subchannel bitmap 522.

In certain aspects, an AP (e.g., AP 102 of FIG. 1) may transmit, via one or more subchannels of an operating band, the legacy IE 500 to a BSS (e.g., a plurality of STAs) with the non-legacy element 512. In some examples, the disabled subchannel bitmap 522 may be configured to indicate which subchannels of the operating band are subject to a puncturing event in the future. For example, the disabled subchannel bitmap 522 may include a multi-bit bitmap, wherein each bit may be mapped to one of the plurality of subchannels within the operating band used by the BSS. Thus, using the example of FIG. 4, the AP may set the multi-bit bitmap such that a bit corresponding to the fourth subchannel 404d is set to a "1," while the remaining bits (e.g., which correspond to the first subchannel 404a, the second subchannel 404b, the third subchannel 404c, the fifth subchannel 404e, and the sixth subchannel 404f) are all "0." Accordingly, the multi-bit bitmap of the disabled subchannel bitmap 522 element may be used to notify the BSS which subchannels will be subject to a puncturing event. Thus, the bitmap may be used to indicate a puncturing pattern for the AP and STAs to apply to communications within the BSS.

It should be noted that if the puncturing event later ends (e.g., the AP and its BSS can resume transmitting over the previously punctured subchannel), then the AP may transmit the legacy IE 500 to the BSS, wherein the bit in the bitmap corresponding to the previously punctured subchannel is set to "0." In some cases, if none of the subchannels are punctured, the AP may transmit the legacy IE 500 with the disabled subchannel bitmap 522 element omitted.

In some examples, the AP may include the legacy IE 500 in a management frame (e.g., beacon frame, probe response frame, extended channel switch announcement frame, etc.) transmission to one or more STAs in the BSS. The AP and the STAs may apply the puncturing pattern indicated in the disabled subchannel bitmap 522 one TBTT after the TBTT during which the legacy IE 500 is transmitted in the management frame.

The disabled subchannel bitmap 522 element may include any suitable number of bits for representing the number of subchannels in an operating band. For example, in a 16-subchannel operating band, the disabled subchannel bitmap 522 element may include 16 bits. In an 8-subchannel operating band, the disabled subchannel bitmap 522 element may include 8 bits.

In certain aspects, a disabled subchannel bitmap switch countdown element (not shown) may provided in the legacy IE 500. The disabled subchannel bitmap switch countdown element may provide a countdown timer so that the devices of the BSS (e.g., the AP and the STAs) are able to simultaneously switch communications to a new puncture pattern indicated by the disabled subchannel bitmap element 522, as discussed in more detail below in reference to FIG. 7.

Figure 6:
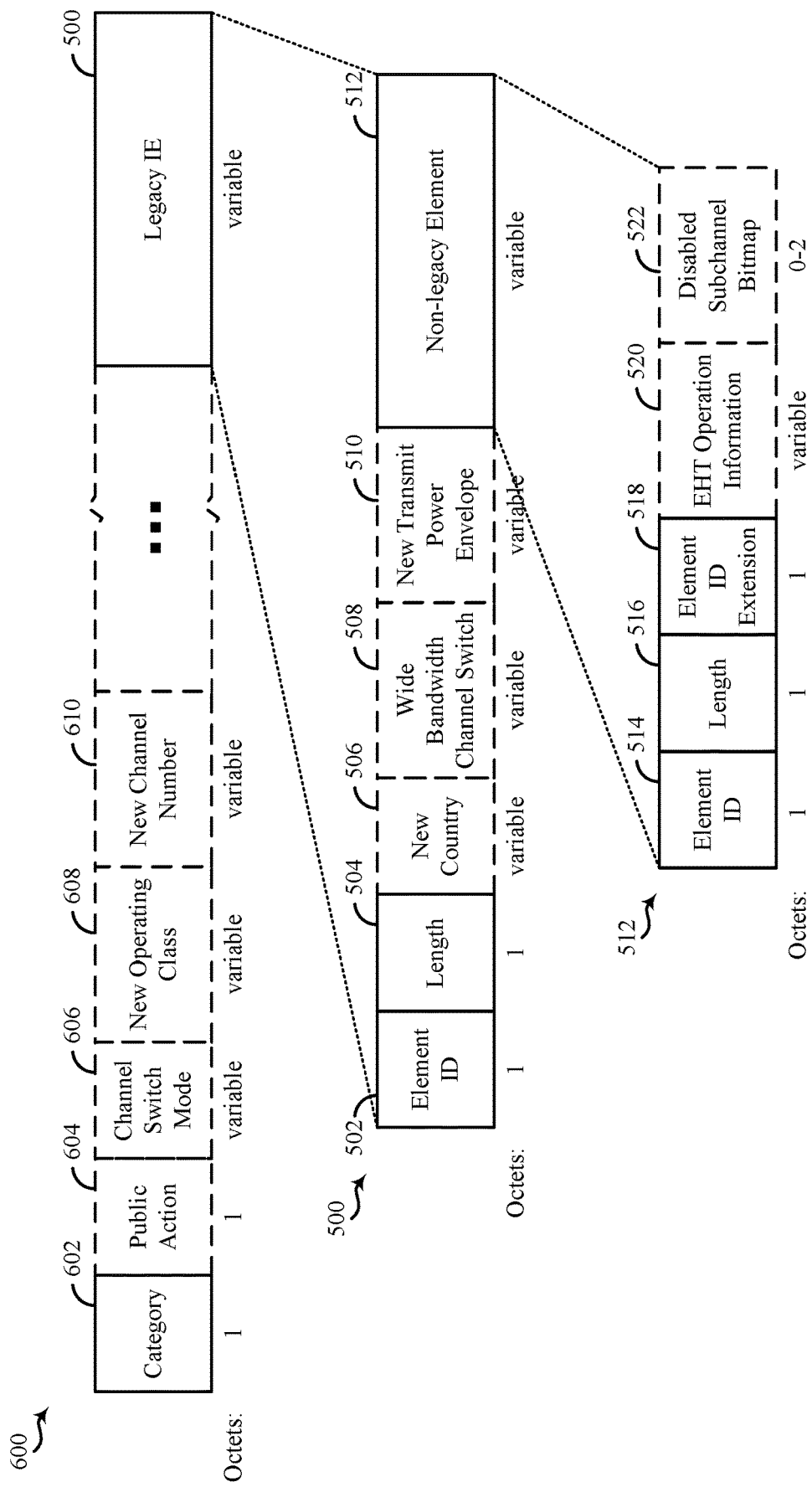
FIG. 6 is a block diagram illustrating a legacy action frame that includes a non-legacy element.

FIG. 6 is a block diagram illustrating a legacy action frame 600 (e.g., an extended channel switch announcement frame) that includes a legacy IE 500 having non-legacy elements. The legacy action frame 600 may be formatted as an extreme high throughput (EHT) WLAN action frame in accordance with the IEEE 802.11be amendment to the IEEE 802.11 wireless communication protocol standard, or may be formatted as an action frame conforming to any later (post-EHT) version of a new wireless communication protocol conforming to a future IEEE 802.11 wireless communication protocol standard or other wireless communication standard. In some implementations, the legacy action frame 500 may carry information in one or more 20 MHz subchannels of an operating band (e.g., the operating band 402 illustrated in FIG. 4).

The legacy action frame 600 includes several legacy elements (e.g., a category element 602, and other optional legacy elements: a public action 604, channel switch mode 606, new operating class 608, and new channel number 610). It should be noted that depending on implementation, the legacy action frame may include additional elements. The legacy IE 500 of the action frame 600 may include one or more of the elements of the legacy IE 500 of FIG. 5 (e.g., the channel switch wrapper IE) that includes the non-legacy element 512. Using an example of an extended channel switch announcement frame, if the AP determines to change only the puncturing pattern of the operating band instead of changing both the operating band (e.g., switching to another operating band) and the puncturing pattern, the AP may set the New Channel Number 610 field in the frame 600 to indicate that the new puncturing pattern applies to the current operating channel. For example, the AP may set the New Channel Field to equal a number identifying the current operating band. If a receiving STA associated with the AP detects that the New Channel Number 610 field indicates its current operating channel, the receiving STA may decide to transmit to the AP using only a primary subchannel (e.g., one 20 MHz subchannel) until the receiving STA obtains the updated disabled subchannel bitmap 522 from one or more beacons transmitted by the AP after the scheduled puncturing event. In other words, the receiving STA may only start using the latest puncturing pattern (include full bandwidth operation with which no subchannel is punctured) after confirming the puncturing pattern in the beacon transmissions.

In some implementations, the legacy IE 500 of the legacy action frame 600 of FIG. 6 may be omitted. In such an example, the non-legacy element 512 may include the non-legacy element 512 of FIG. 5 (e.g., element ID 514, a length 516, an element ID extension 518, and may optionally include EHT operation information 520, and a disabled subchannel bitmap 522).

In certain aspects, a disabled subchannel bitmap switch countdown element or field (not shown, e.g. the Channel Switch Count field in an Extended Channel Switch Announcement element) may provided in the action frame 600 or the legacy IE 500. The disabled subchannel bitmap switch countdown element or field may provide a countdown timer so that the devices of the BSS (e.g., the AP and the STAs) are able to simultaneously switch communications to a new puncture pattern indicated by the disabled subchannel bitmap element 522, as discussed in more detail below in reference to FIG. 7.

Figure 7:
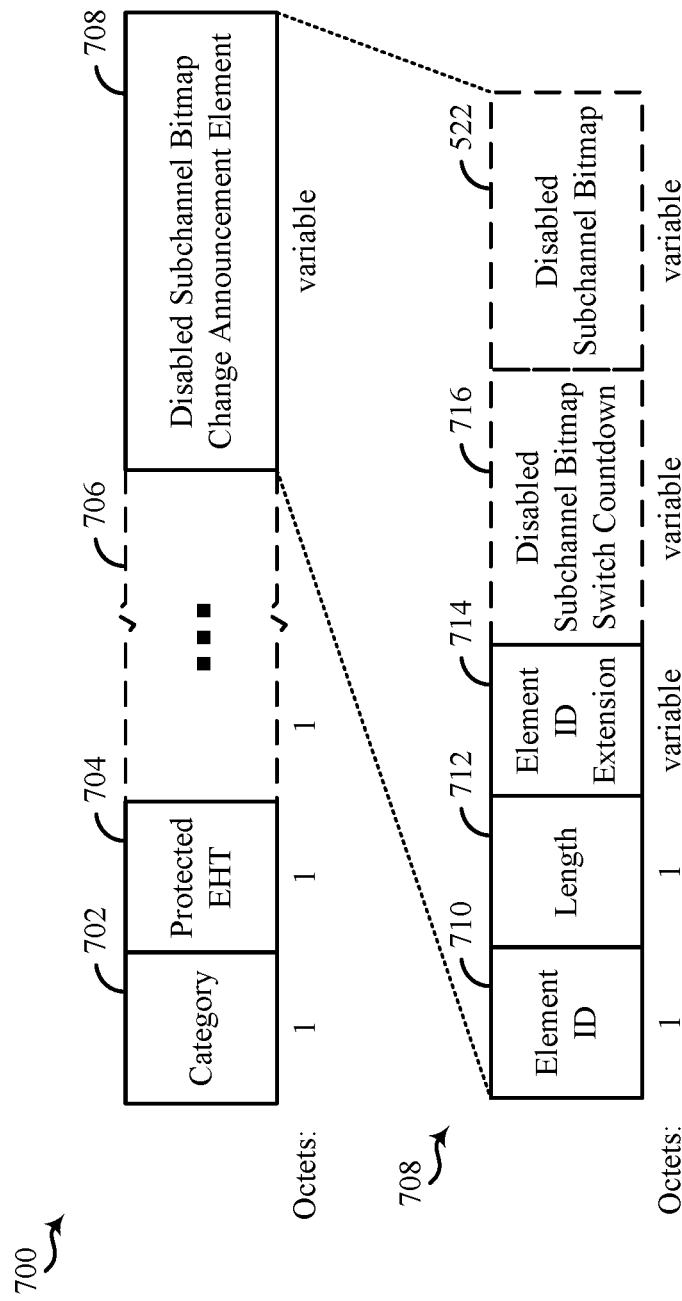
FIG. 7 is a block diagram illustrating a non-legacy action frame that includes a non-legacy IE.

FIG. 7 is a block diagram illustrating a non-legacy action frame 700 (e.g., a disabled subchannel bitmap change announcement frame) that includes a non-legacy IE (e.g., a channel switch wrapper IE including a disabled subchannel bitmap change announcement element 708. The non-legacy action frame 700 may be formatted as an extreme high throughput (EHT) WLAN action frame in accordance with the IEEE 802.11be amendment to the IEEE 802.11 wireless communication protocol standard, or may be formatted as an IE conforming to any later (post-EHT) version of a new wireless communication protocol conforming to a future IEEE 802.11 wireless communication protocol standard or other wireless communication standard. In some implementations, the non-legacy action frame 700 may carry information in one or more 20 MHz subchannels of an operating band (e.g., the operating band 402 illustrated in FIG. 4).

The non-legacy action frame 700 includes several elements (e.g., a category element 702, a protected EHT element 704, and the disabled subchannel bitmap change announcement element 708). As illustrated, the disabled subchannel bitmap change announcement element 708 includes an element ID element 710, a length element 712, an element ID extension element 714, a disabled subchannel bitmap switch countdown element 716, and the disabled subchannel bitmap element 522 described above in reference to FIGS. 5 and 6.

In one example, the AP may transmit the non-legacy action frame 700 to the STAs of a BSS in response to determining that a subchannel used for communication in the BSS will be punctured in the future. Similar to FIGS. 5 and 6 above, the AP may set the disabled subchannel bitmap element 522 to indicate a puncture pattern for continued communication in the BSS without the punctured subchannel. In certain aspects, the disabled subchannel bitmap switch countdown element 716 may provide a countdown timer so that the devices of the BSS (e.g., the AP and the STAs) are able to simultaneously switch communications to a new puncture pattern indicated by the disabled subchannel bitmap element 522. For example, the disabled subchannel bitmap switch countdown element 716 may include an integer value configured to indicate a time the puncturing event will start. The start time may be indicated relative to a TBTT or a time unit (TU).

Accordingly, the integer value may indicate a number of TBTTs or TUs, after which the AP and the STAs will switch communications to the puncturing pattern. For example, if the disabled subchannel bitmap switch countdown element 716 is a "2," then the AP and STAs may switch to the puncturing pattern upon the second TBTT or TU to occur after transmission of the non-legacy action frame 700. In another example, if the disabled subchannel bitmap switch countdown element 716 is a "1," then the AP and STAs may switch to the puncturing pattern upon the next TBTT or TU to occur after transmission of the non-legacy action frame 700. In some examples, if the STA determines that the integer meets an equality condition (e.g., the integer value equals "1"), the STA may determine that the integer value indicates the start of the puncturing event. The STA may then apply the puncturing pattern for subsequent frame exchanges.

In some examples, the disabled subchannel bitmap switch countdown element 716 and the disabled subchannel bitmap element 522 may be omitted from the disabled subchannel bitmap change announcement element 708. For example, the AP may determine that a subchannel of the operating band used for communication within the BSS is no longer punctured. In such a case, the AP may notify the STAs that they may resume using the previously punctured subchannel for communications by transmitting the non-legacy action frame 700 and omitting the disabled subchannel bitmap switch countdown element 716 and the disabled subchannel bitmap element 522. In another example, the disabled subchannel bitmap switch countdown element 716 may be included to provide the STAs with a countdown timer indicating when the AP and STAs can resume communicating with the previously punctured subchannel. In this way, the AP and STAs can simultaneously resume the communications.

It should be noted that although FIG. 7 illustrates a non-legacy action frame 700, one or more of the elements within the action frame 700 and the disabled subchannel bitmap change announcement element 708 may alternatively or additionally be included in other management frames (e.g., a beacon frame, a probe response frame, an association or reassociation frame, etc.).

Figure 8A:
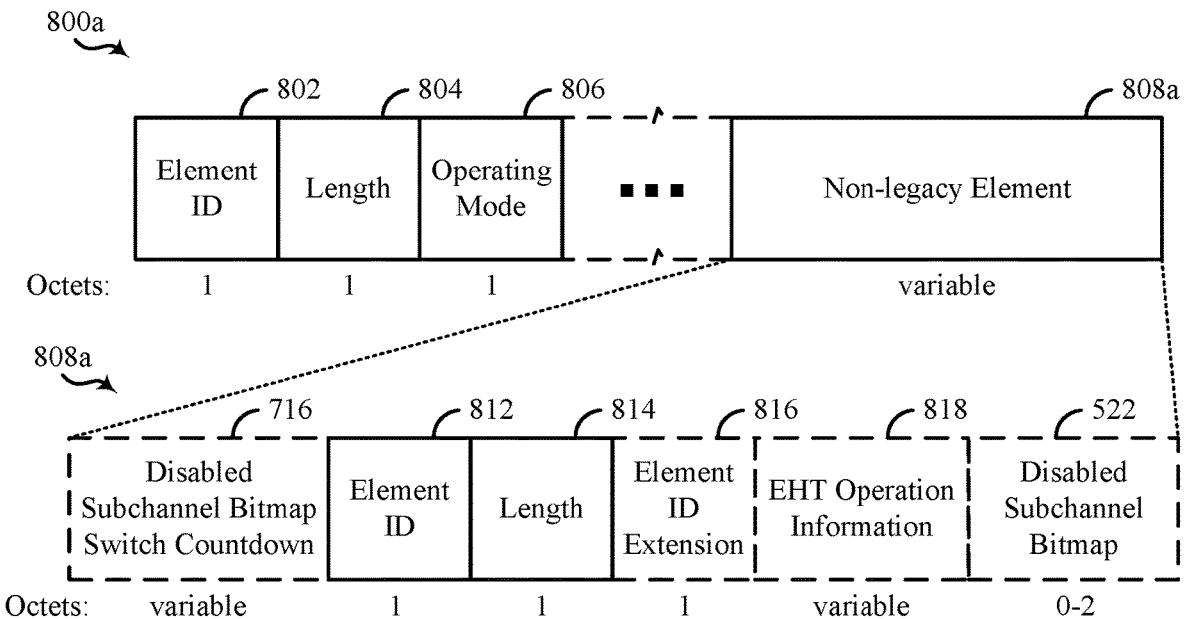
FIGS. 8A and 8B are block diagrams illustrating a first example of a legacy management frame and a second example of a legacy management frame.

FIG. 8A is a block diagram illustrating a first example of a legacy management frame 800a (e.g., a beacon frame) that includes a non-legacy IE 808a (e.g., an operating mode notification IE). The legacy management frame 800a may be formatted as an extreme high throughput (EHT) WLAN action frame in accordance with the IEEE 802.11be amendment to the IEEE 802.11 wireless communication protocol standard, or may be formatted as an IE conforming to any later (post-EHT) version of a new wireless communication protocol conforming to a future IEEE 802.11 wireless communication protocol standard or other wireless communication standard. In some implementations, the legacy management frame 800a may carry information in one or more 20 MHz subchannels of an operating band (e.g., the operating band 402 illustrated in FIG. 4).

The legacy management frame 800a includes several elements (e.g., a element ID 802, a length 804, and an operating mode 806). As illustrated, the legacy management frame 800a also includes a non-legacy IE 808a that includes the disabled subchannel bitmap switch countdown 716 of FIG. 6, an element ID 812, a length 814, and optionally an element ID extension 816, EHT operation information 818, and a disabled subchannel bitmap 522.

Figure 8B:
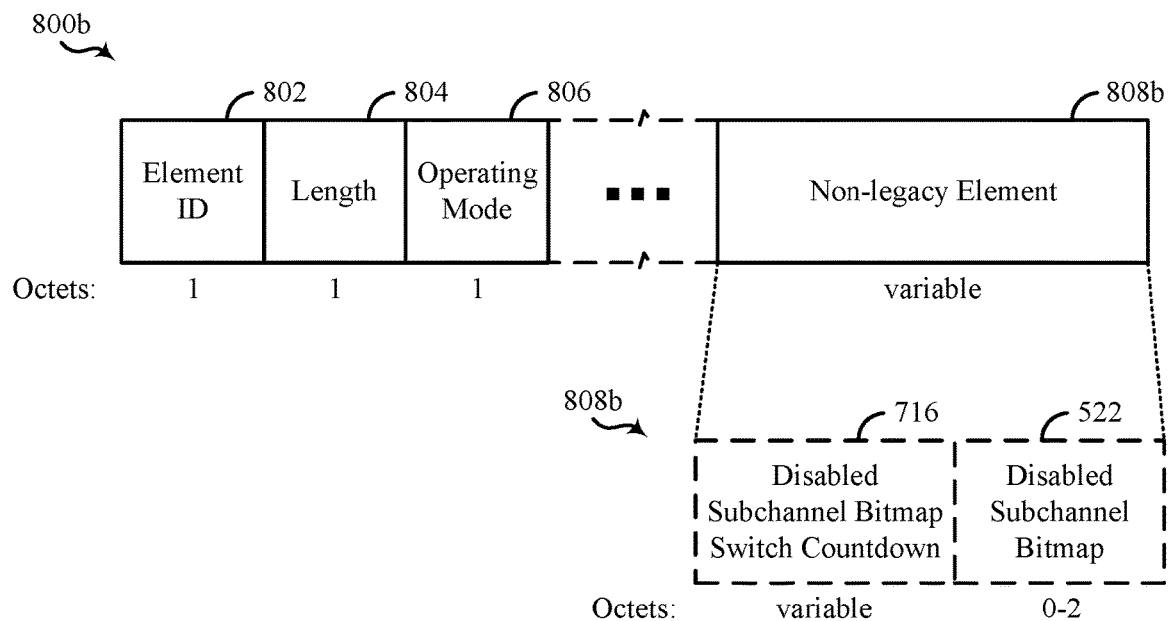

In the example of FIG. 8A, the non-legacy portion of the legacy management frame 800a is an information element. However, as illustrated in FIG. 8B, the non-legacy portion may be two additional elements added to the legacy management frame. For example, FIG. 8B is a block diagram illustrating a second example of a legacy management frame 800b (e.g., a beacon frame) that includes a non-legacy element 808b that includes the disabled subchannel bitmap switch countdown 716 and the disabled subchannel bitmap 522.

Figure 9A:
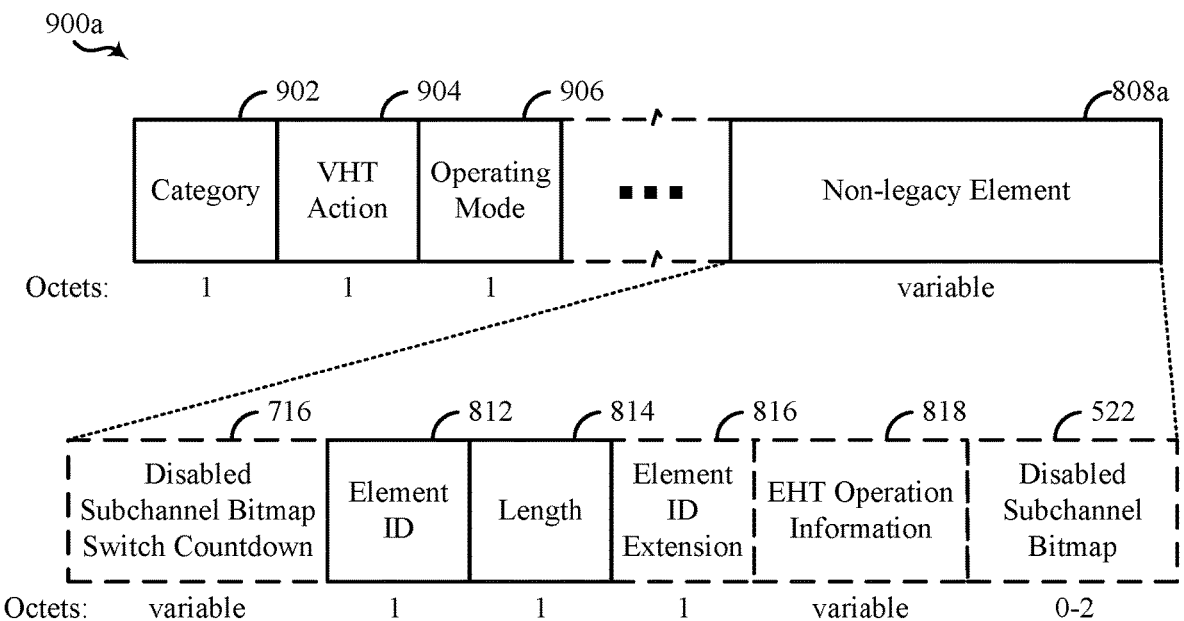
FIGS. 9A and 9B are block diagrams illustrating a first example of a legacy management frame and a second example of a legacy management frame.
Figure 9B:
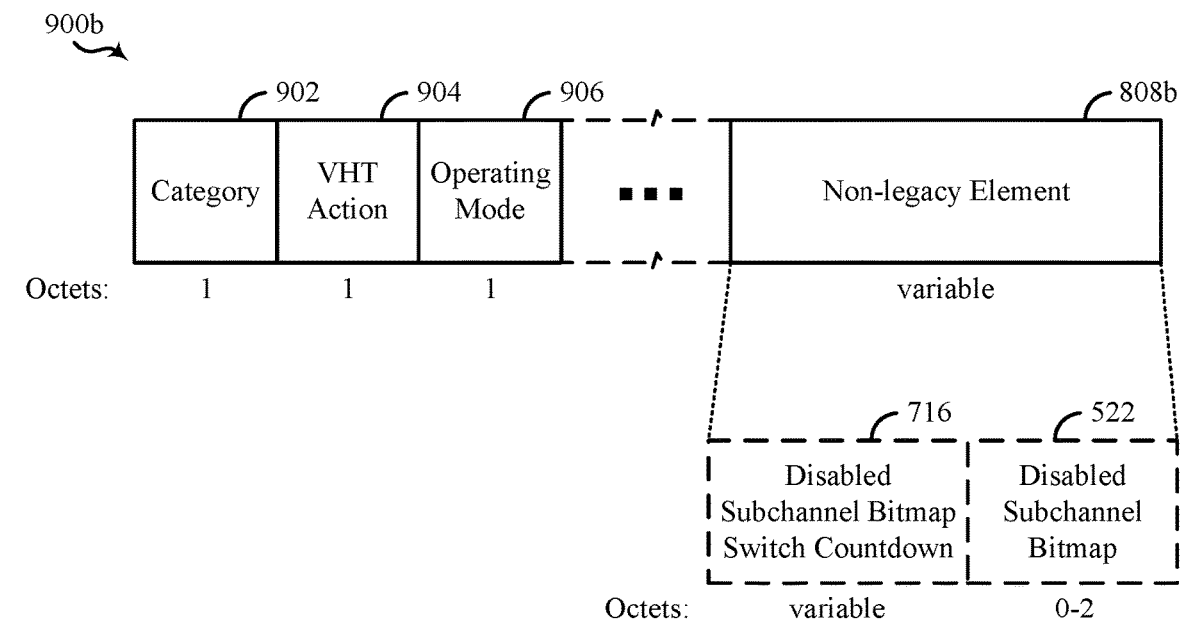

FIGS. 9A and 9B are a block diagram illustrating a first example of a legacy management frame 900a (e.g., an action frame) and a second example of a legacy management frame 900b. The first example 900a includes the non-legacy IE 808a of FIG. 8A, and the second example 900b that includes the non-legacy element 808b of FIG. 8B. The legacy management frames 900a and 900b may include a category element 902, a VHT action element 904, and operating mode 906, and any other elements according to implementation.

It should be noted that an AP may repeatedly transmit the non-legacy elements discussed in FIGS. 5-9. For example, the AP may repeat transmission of the non-legacy elements between the time that the AP determines the puncturing event and the time that the puncturing event occurs. In one example, the AP may transmit a beacon frame that includes the non-legacy elements at each TBTT prior the puncturing event, if there are multiple TBTTs. The AP may also dynamically transmit the non-legacy elements in an action frame. In one example, if there are no TBTTs the time that the AP determines the puncturing event and the time that the puncturing event occurs, the AP may instead transmit the non-legacy elements in an action frame. However, it should be noted that the AP may transmit the non-legacy elements multiple times using both beacon frames and action frames.

Figure 10:
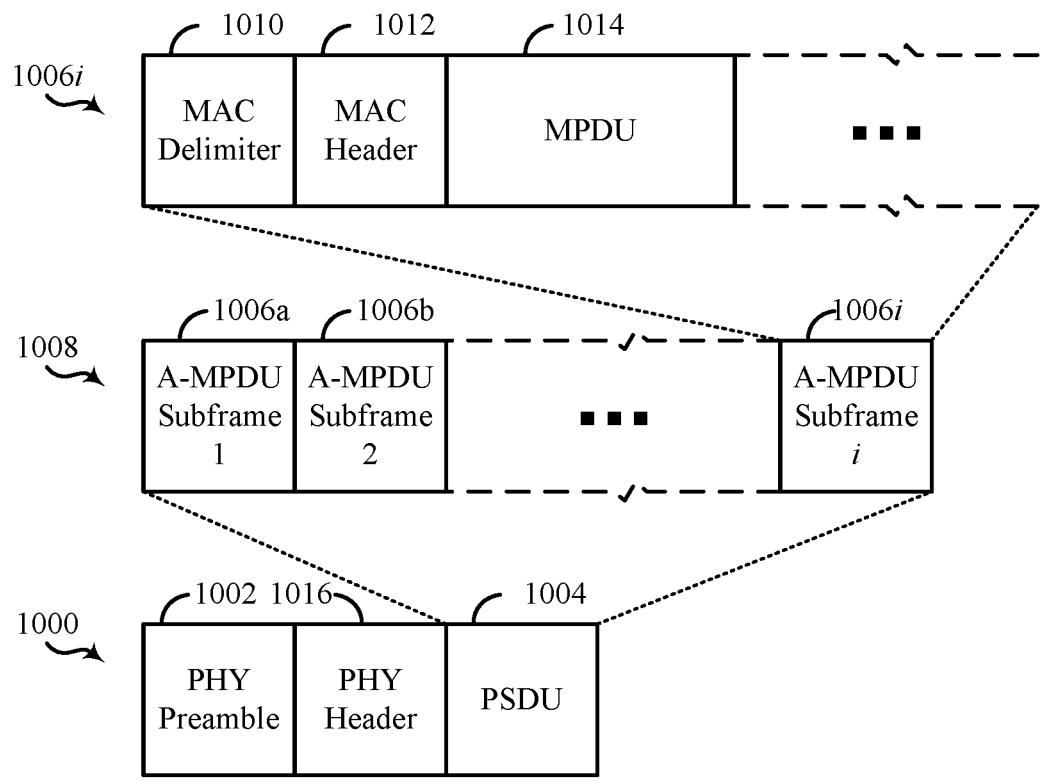
FIG. 10 is a block diagram illustrating an example PPDU usable for communications between an AP and one or more STAs.

FIG. 10 is a block diagram illustrating an example PPDU 1000 usable for communications between an AP (e.g., AP 102 of FIG. 1) and one or more STAs (e.g., STA 104 of FIG. 1). Each PPDU 1000 may include a PHY preamble 1002, a PHY header 1016, and a physical layer convergence protocol (PLCP) service data unit (PSDU) 1004. Each PSDU 1004 may carry one or more MAC protocol data units (MPDUs). For example, each PSDU 1004 may carry an aggregated MPDU (A-MPDU) (e.g., a first A-MPDU 1006a, a second A-MPDU 1006b, and an $i^{th}$ A-MPDU 1006i) that includes an aggregation of the A-MPDU subframes 1006. Each A-MPDU subframe 1006 may include a MAC delimiter 1010 and a MAC header 1012 prior to the accompanying MPDU 1014, which comprises the data portion ("payload" or "frame body") of the A-MPDU subframe 1006.

Referring back to the PPDU 1000, the PHY header 1016 may include the information provided in one or more of the disabled subchannel bitmap switch countdown 716 of FIG. 7 and the disabled subchannel bitmap 522 of FIG. 5. Referring back to the A-MPDU subframe 1006, in addition or in the alternative, the MAC header 1012 may include the information provided in one or more of the disabled subchannel bitmap switch countdown 716 of FIG. 7 and the disabled subchannel bitmap 522 of FIG. 5. That is, the PHY header 1016 and/or MAC header 1012 may provide an indication of a puncturing event, an identification of the one or more subchannels affected by the puncturing event, and/or an indication of a time at which the puncturing event will occur.

Accordingly, an AP may transmit a PPDU 1000 to the one or ore STAs of a BSS, wherein the PPDU 1000 is configured to provide puncturing information to the STAs via one or more of the PHY header 1016 or the MAC header 1012. In response to the puncturing information, the STAs may apply the puncturing pattern to subsequent frame exchanges.

Figure 11:
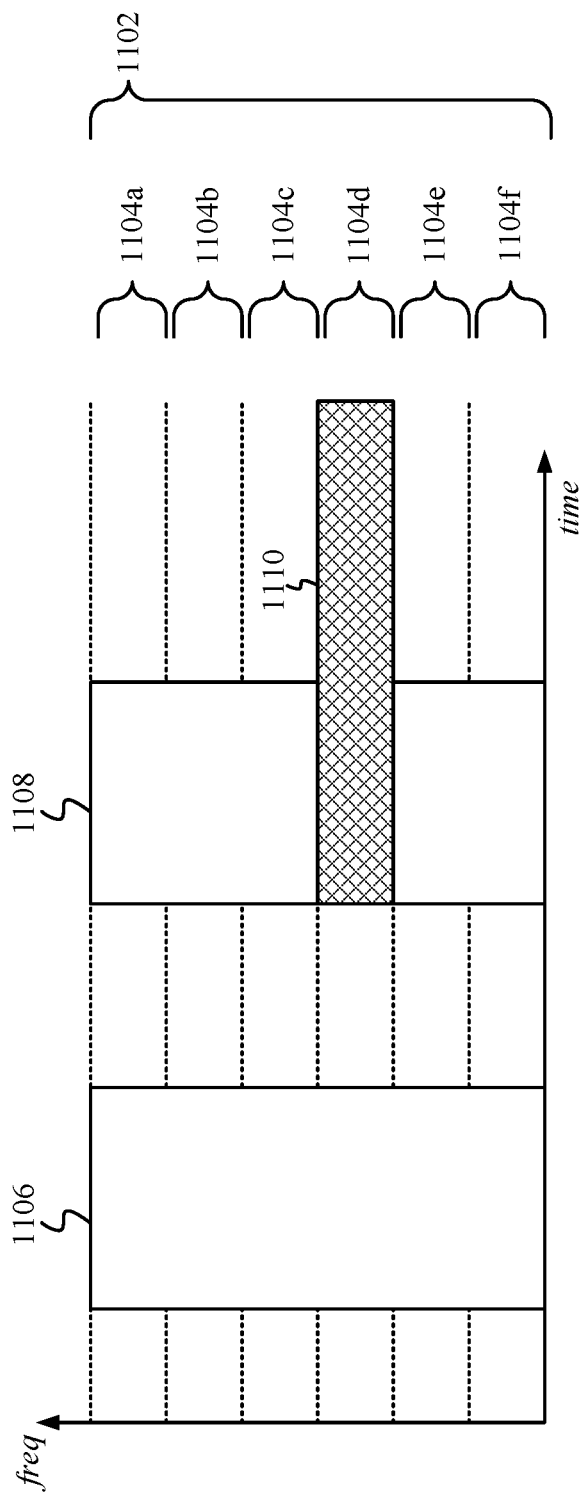
FIG. 11 is a schematic illustrating a conceptual time-based illustration of an example punctured transmission in a BSS environment from the perspective of an AP.

FIG. 11 is a schematic illustrating a conceptual time-based illustration of an example punctured transmission in a basic service set (BSS) environment from the perspective of an AP (e.g., AP 102 of FIG. 1). In this example, the AP may transmit first data 1106 to an STA (e.g., STA 104 of FIG. 1) using an entire operating band 1102 of six bonded subchannels 1104a-f. The AP may then determine that a fourth subchannel 1104d will be punctured 1110 in the future during a second data 1108 transmission. Accordingly, the AP may transmit the second data using the subchannels of the operating band 1102 with the exception of the fourth subchannel 1104d. It should be noted that the AP may not transmit any indication of a puncturing event (e.g., a countdown or particular subchannel that will be affected by the puncturing event 1110).

Accordingly, an STA receiving the second data 1108 may still be listening to the entire operating band 1102, including the punctured subchannel. However, in certain aspects, the STA may be configured to determine whether signaling from the AP is transmitted on each of the subchannels 1104a-f. In this example, the STA may determine that the AP's transmission of the second data 1108 did not include transmission of any of the data on the fourth subchannel 1104d. Accordingly, the STA may mirror the AP's transmission pattern by omitting the transmission of any signaling on the fourth subchannel following receipt of the second data 1108. In some examples, the STA may continue to listen to the fourth subchannel 1104d for an energy level or valid symbols indicative of the AP resuming transmission over the fourth subchannel 1104d. In this case, the STA may again mirror the AP's transmission patter and resume transmission over the fourth subchannel 1104d.

Figure 12:
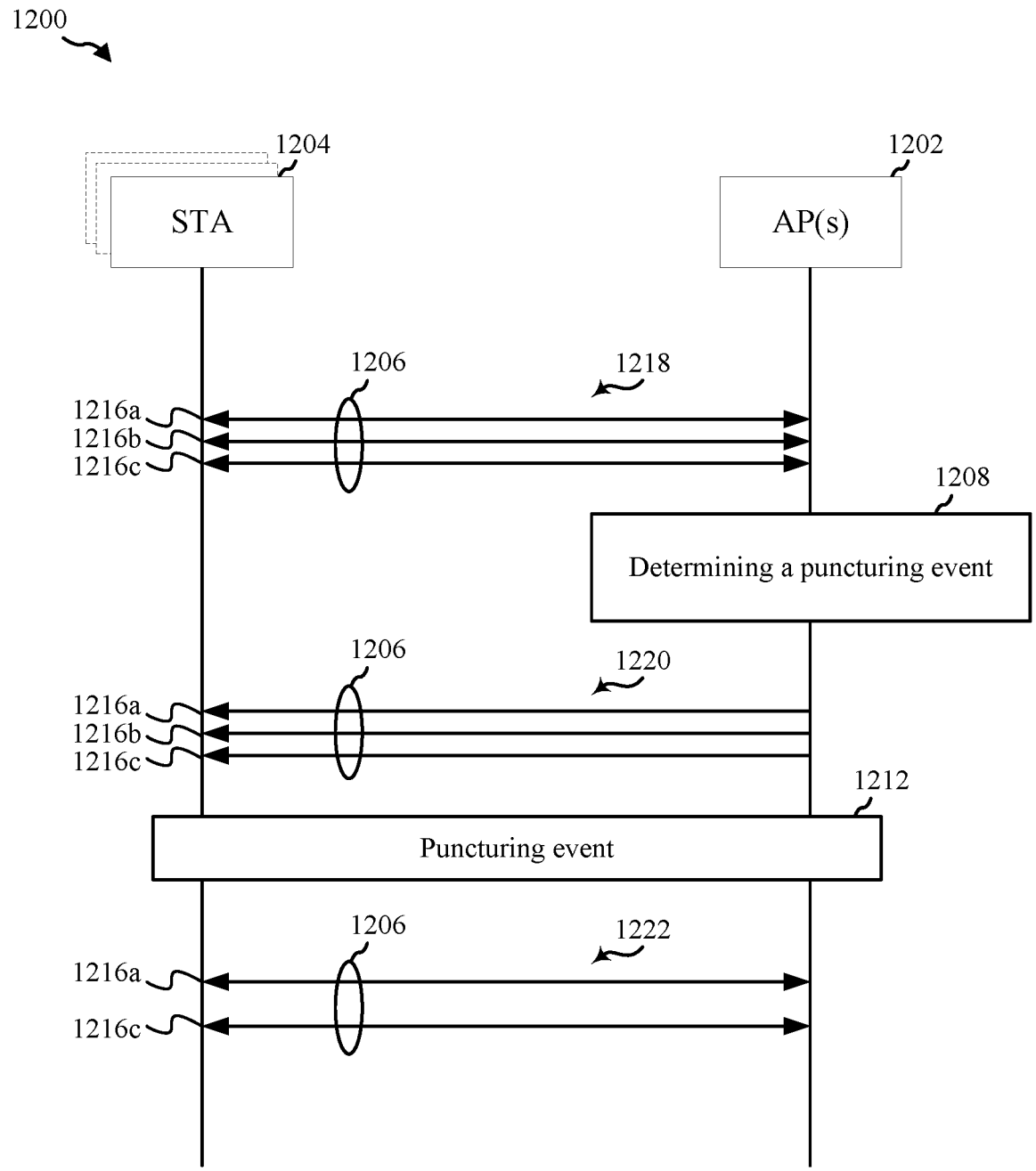
FIG. 12 is a call-flow diagram illustrating example communications in a BSS between one or more STAs and an AP.

FIG. 12 is a call-flow diagram 1200 illustrating example communications in a BSS between one or more STAs 1204 and an AP 1202. Initially, in a first communication 1218, the AP 1202 and STA 1204 may communicate data via a first operating band 1206 comprising at least a first subchannel 1216a, a second subchannel 1216b, and a third subchannel 1216c.

At a first process 1208, the AP 1202 may determine a puncturing event 1212 starting in the future, wherein the puncturing event is associated with the second subchannel 1216b.

In a second communication 1220, the AP 1202 may output for transmission, prior to the start of the puncturing event, at least one management frame to the one or more STAs, wherein the management frame comprises a non-legacy element configured to indicate the puncturing event 1212 and the second subchannel 1216b. The AP 1202 may transmit the information via the first subchannel 1216a, the second subchannel 1216b, and the third subchannel 1216c. It should be noted that the management frame may include any combination of IEs, elements, frames, and information described above in reference to FIGS. 5-10.

In a third communication 1222, based on the management frame of the second communication 1220, the AP 1202 and the STAs 1204 may communicate over the first operating band 1206 using the first subchannel 1216a and the third subchannel 1216c, while refraining from outputting data for transmission via the first subchannel.

Example Techniques for Capability Signaling in a BSS

As discussed, an AP may communicate with one or more STAs in a BSS over an operating band comprising multiple subchannels. While the above discusses examples for continuing to communicate over the same operating band when one or more of the multiple subchannels are punctured, certain aspects of the disclosure are directed to techniques for switching from a first operating band (e.g., a first plurality of subchannels) to a second operating band (e.g., a second plurality of subchannels). For example, if the AP detects sufficient channel degradation or noise, the AP may determine to switch from a 2.4 GHz operating band to a 5 GHz or 6 GHz operating band, or any other pair or combination of operating bands.

However, each operating band (2.4 GHz, 5 GHz, 6 GHz) may require a different set of capabilities of the AP and/or STAs for communication thereon. An AP may collect the requisite capabilities for a particular operating band using a beacon or probe response on the new operating band. The STA may indicate its capabilities to the AP via a reassociation request, but reassociation at the new operating band may purge all existing associations (e.g., security context, block acknowledgement (ACK) context, and any other state machines or associations that the STA is maintaining) between the AP and the STA. Thus, a smoother, more seamless transition may enhance BSS communications.

In one example, an STA may perform the switch from the first operating band to the second operating band with the AP. However, if the communication capabilities of the STA are not aligned with the capabilities required to communicate on the second operating band (e.g., the capabilities of the first operating band are different from the capabilities of the second operating band, or the capabilities of the second operating band were not advertised on the first operating band), then the STA may transmit a probe request frame to the AP on the second operating band. In some examples, the probe request frame indicates its capabilities to the AP. However, in some examples, when the AP switches to the new operating band, a probe storm may result when multiple STAs simultaneously transmit probe requests to the AP. Thus, to prevent packet error and signal collision issues caused by a probe storm, the AP may use one or more of the following techniques.

Initially, the AP may notify one or more STAs of the AP's determination to switch operation bands. In one example, the AP may notify the one or more STAs of the switch via a management frame. The management frame may include any one or more of the non-legacy elements described above in relation to FIGS. 4-9. In this example, the non-legacy elements may include an indication of the operating band that the AP is going to switch to. The non-legacy elements may also include an indication of enhanced distributed channel access (EDCA) parameters determined by the AP (as discussed below in the first technique), an indication that the AP will transmit a trigger frame to the STAs after the switch to the new operating band (as discussed below in the second technique), and/or an indication of a backoff period (as discussed below in the third technique).

In a first technique, the AP may increase an enhanced distributed channel access (EDCA) parameter to provide a longer contention window (CW) on the new operating band so that the multiple STAs have a longer period of time to switch to the new operating band. By providing the STAs with a longer CW duration, the AP reduces the likelihood of a probe storm. For example, the STAs will not be required to transmit their probe requests within simultaneously within a relatively small CW. Instead, probe requests can be spread out across a longer duration of time.

In this example, the AP may advertise, via a management frame (e.g., a beacon frame, probe response frame, action frame, etc.) the higher EDCA parameter to the STAs. The AP may advertise the higher EDCA parameter on one or more of the first operating band before the switch, or the second operating band after the switch. For example, by advertising the higher EDCA parameter on the first operating band before the switch, the AP gives the STAs an opportunity to update their EDCA parameters prior to the switch to the second operating band. Thus, when one or more of the STAs switch to the second operating band, any latency between a time that an STA joins the second operating band and a time that the STA transmits its capabilities to the AP is reduced because the STAs do not have to update their EDCA parameters.

In some examples, the AP may advertise the higher EDCA parameter on the second operating band after the switch. In such an example, the AP only advertises to the one or more STAs that follow the AP to the new operating band. For example, not all STAs in a BSS may switch operating bands with the AP. In such a case, not all of the STAs would use the higher EDCA parameters advertised on the first operating band. Therefore, by not advertising the higher EDCA parameters on the first operating band before the switch, the AP may preserve communication resources on the first operating band, and more efficiently communicate the higher EDCA parameters to only the STAs that require the information (e.g., the one or STAs that follow the AP to the second operating band). In some examples, the AP may determine a length of a CW based on a number of STAs in the BSS or a number of STAs that it expects to switch to the second operating band. For example, the CW may increase as the number of STAs increases.

It should be noted, however, that in some examples, the AP may advertise the higher EDCA parameters on both the first operating band before the switch, and the second operating band after the switch. In such an example, any STAs that switch to the second operating band with the AP can update their EDCA parameters according to the advertised higher EDCA parameters, but if one or more STAs do not receive the advertisement on the first operating band (e.g., due to interference, etc.), the AP's advertisement of the higher EDCA parameters on the second operating band after the switch may provide the one or more STAs with an opportunity to update their EDCA parameters.

In a second technique, the AP may transmit a trigger frame to one or more STAs to solicit probe requests from the one or more STAs at different times to prevent a probe storm. Each trigger frame may address one or more STAs through a respective association identifier (AID), and may schedule each AID (and thus each STA) one or more resource units (RUs) that can be used by the corresponding STA to send the probe request to the AP. For example, the one or more RUs may indicate a specific RU assigned to an STA, over which the STA may transmit a probe request. The AP also may designate one or more random access (RA) RUs that unscheduled STAs may contend for. In either example, the STAs may, in response to the trigger frame, transmit their respective probe requests to the AP using the assigned RUs or the RA RUs. This provides the AP with the ability to schedule the STAs so that their transmitted probe requests do not collide.

In some examples, the AP, before switching from the first operating band to the second operating band, may transmit an indication of the operating band switch (e.g., via management frame) wherein the indication comprises a field indicating whether the AP will transmit trigger frames to the STAs over the second operating band after the switch. In some examples, the field is a 1-bit field. The AP may set the field to indicate that it will transmit a trigger frame to the STAs after the switch, in which case the STAs may refrain from transmitting a probe request on the second operating band until after they receive the trigger frame. If the AP does not set the field, then the STAs may assume that the AP will not transmit a trigger frame in the second operating band, and the STAs may transmit probe requests prior to receiving any trigger frame.

In a third technique, the AP, before switching from the first operating band to the second operating band, may transmit an indication of the operating band switch (e.g., via management frame). In response to the indication of the switch, the STAs may determine a backoff period (e.g., an amount of time) that the respective STA may wait after the switch to the second operating band before transmitting a probe request to the AP. Thus, because each STA determines a backoff period, the likelihood of collision due to probe storm is reduced because the STAs may all transmit probe requests at different times.

In some examples, one or more STAs may randomly generate a backoff period based on a size of the CW. For example, the AP may provide the STAs with EDCA parameters indicating the duration of the CW. In response, each STA may generate a random backoff period falling between the time of the switch to the second operating band and the end of the CW. In some examples, the AP may preconfigure one or more STAs with a backoff period via a management frame transmitted over the first operating band and/or the second operating band.

It should be noted that one or more of the first technique, the second technique and the third technique may be used by the AP and STAs to prevent a probe storm after switching to a new operating band.

Figure 13:
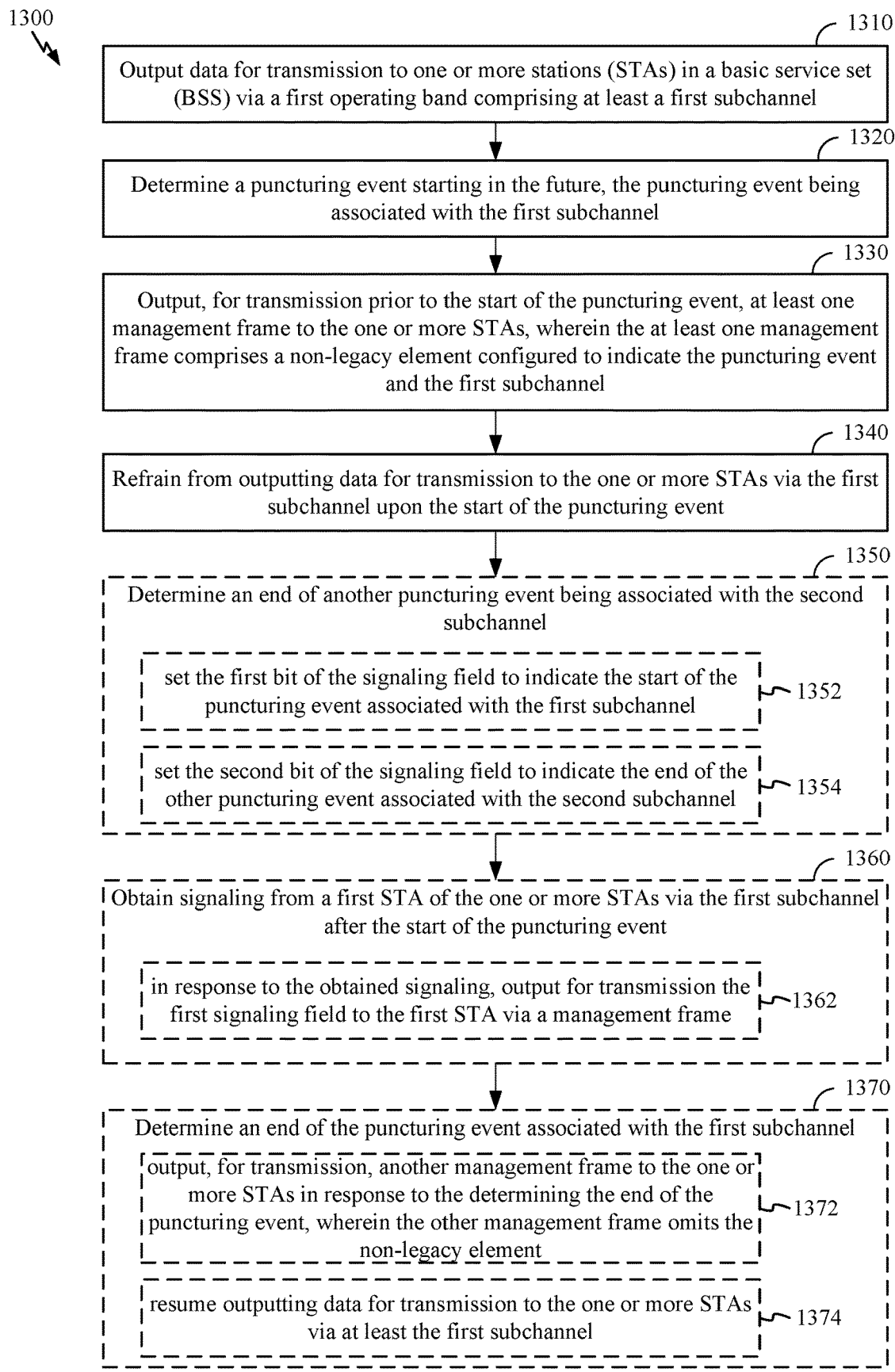
FIG. 13 is a flow diagram illustrating example operations for wireless communication, in accordance with certain aspects of the present disclosure.

FIG. 13 is a flow diagram illustrating example operations 1300 for wireless communication. The operations 1300 may be performed, for example, by an AP (e.g., such as the AP 102 of FIG. 1). The operations 1300 may be implemented as software components that are executed and run on one or more processors (e.g., controller 230 of FIG. 2). Further, the transmission and reception of signals by the AP in operations 1300 may be enabled, for example, by one or more antennas (e.g., antennas 224 of FIG. 2). In certain aspects, the transmission and/or reception of signals by the AP may be implemented via a bus interface of one or more processors (e.g., controller 230) obtaining and/or outputting signals.

The operations 1300 begin, at a first block 1310, by outputting data for transmission to one or more stations (STAs) in a basic service set (BSS) via a first operating band comprising at least a first subchannel. For example, the AP and STAs may use the first operating band for WLAN communications.

The operations 1300 may proceed to a second block 1320, by determining a puncturing event starting in the future, the puncturing event being associated with the first subchannel. For example, the AP may determine that another device requires the first subchannel for communication.

The operations 1300 may proceed to a third block 1330, by outputting, for transmission prior to the start of the puncturing event, at least one management frame to the one or more STAs, wherein the at least one management frame comprises a non-legacy element configured to indicate the puncturing event and the first subchannel. For example, the AP may transmit a management frame that includes the non-legacy elements illustrated in FIGS. 5-9, or include the data of the non-legacy elements in a PHY or MAC header.

The operations 1300 may proceed to a fourth block 1340, by refraining from outputting data for transmission to the one or more STAs via the first subchannel upon the start of the puncturing event. For example, in response to the management frame from the AP indicating the punctured first subchannel, the STAs may discontinue receiving and transmitting data over the punctured first subchannel.

The operations 1300 may optionally include a fifth block 1350, for determining an end of another puncturing event being associated with the second subchannel. At a first sub-block 1352, the operations 1300 may proceed to set the first bit of the signaling field to indicate the start of the puncturing event associated with the first subchannel, and at a second sub-block 1354, the operations 1300 may proceed to set the second bit of the signaling field to indicate the end of the other puncturing event associated with the second subchannel. For example, the AP may determine that the first subchannel is going to be punctured, but that a second subchannel (that is currently punctured) will no longer be punctured. Accordingly, the AP may transmit the bitmap described and illustrated in FIGS. 5-9, such that a bit corresponding to the first subchannel is set to "1," while a bit corresponding to the second subchannel is set to "0." As such, the bit map indicates that the first subchannel will be punctured and the second subchannel will no longer be punctured.

The operations 1300 may optionally include a sixth block 1360, for obtaining signaling from a first STA of the one or more STAs via the first subchannel after the start of the puncturing event. At a first sub-block 1362, the operations 1300 may, in response to the obtained signaling, output for transmission the first signaling field to the first STA via a management frame. For example, if one of the STAs does not receive the management frame due to PS or interference, the STA may continue to transmit over the punctured first subchannel. Thus, the AP may continue to listen to the first subchannel after puncturing to determine whether any of the STAs of the BSS are still transmitting on the punctured first subchannel. If the AP detects an STA is still transmitting on the first subchannel after puncturing, the AP may transmit a unicast message to the STA notifying the STA that the first subchannel has been punctured. The STA may stop transmitting over the first subchannel in response to the unicast message.

The operations 1300 may optionally include a seventh block 1370, for determining an end of the puncturing event associated with the first subchannel. At a first sub-block 1372, the operations 1300 may output, for transmission, another management frame to the one or more STAs in response to the determining the end of the puncturing event, wherein the other management frame omits the non-legacy element. At a second sub-block 1374, the operations 1300 may resume outputting data for transmission to the one or more STAs via at least the first subchannel. For example, if the AP determines that a previously punctured subchannel is no longer punctured, the AP may transmit one or more of the legacy and/or non-legacy elements illustrated in FIGS. 5-9, but omit the bitmap (e.g., such that all the bits in the bitmap are set to "0," indicating that none of the subchannels punctured).

In certain aspects, the management frame is a probe response frame, a beacon frame, a unicast action frame, a broadcast action frame, an operating mode notification frame, a channel switch announcement frame, or a (re) association response frame.

In certain aspects, the non-legacy element comprises a first signaling field comprising a plurality of bits, and wherein each bit of the plurality of bits is configured to identify a corresponding subchannel of the first operating band. For example, one signaling field (e.g., Disabled Subchannel Bitmap element) of FIG. 5 may include a bitmap having a plurality of bits. Each bit in the bitmap may correspond to a particular subchannel, and may be used to identify whether that particular channel is punctured or not.

In certain aspects, the non-legacy element comprises a second signaling field comprising an integer value, and wherein the integer value is configured to indicate a time the puncturing event will start. For example, the AP may provide a countdown for when the puncturing event will start so that the AP and STAs of the BSS can simultaneously adjust their communications to the same puncturing pattern.

In certain aspects, at least one of the first signaling field or the second signaling field is repeated in a plurality of transmissions prior to the puncturing event. In some examples, the AP may transmit the indication of the puncturing event multiple times prior to the puncturing actually happening to ensure that all the STAs receive the indication. The multiple indications may also serve as a countdown with the integer value being changed with each repeated transmission of the indication.

In certain aspects, each of the plurality of transmissions is separated in time according to a periodic time interval or a dynamic time interval. In some examples, the repeated transmissions may happen at every TBTT (e.g., periodically), or dynamically.

In certain aspects, the integer value is further configured to indicate a countdown time to the start of the puncturing event. For example, multiple indication transmissions may serve as a countdown with the integer value being changed with each repeated transmission of the indication.

In certain aspects, the one or more processors are further configured to cause the apparatus to determine that the integer value satisfies an equality condition, wherein the satisfaction of the equality condition indicates the start of the puncturing event. For example, if the integer value received by the AP or STA is a certain value, the AP or STA may determine the puncturing event has started. For example, if the STA receives a management frame where the integer value is "1," the STA may determine that the "1" value is equal to a value (e.g., also "1") indicative of the start of the puncturing event. In some examples, the "1" may indicate that the puncturing event starts at the next time unit (e.g., TBTT).

In certain aspects, the other management frame is configured to notify the one or more STAs that the apparatus will resume outputting data for transmission via the first subchannel. For example, the AP may transmit another management frame with a bitmap indicating that a previously punctured subchannel is no longer punctured, and that the BSS can resume transmitting over it again.

In certain aspects, the management frame comprises a plurality of elements, and wherein one or more of the plurality of elements are non-legacy elements. For example, the management frame may include one or more of the fields, elements, and/or information elements (IEs) illustrated in FIGS. 5-9.

In certain aspects, the operations 1300 support a transceiver configured to transmit the data and the at least one management frame, wherein the apparatus is configured as an access point (AP).

Figure 14:
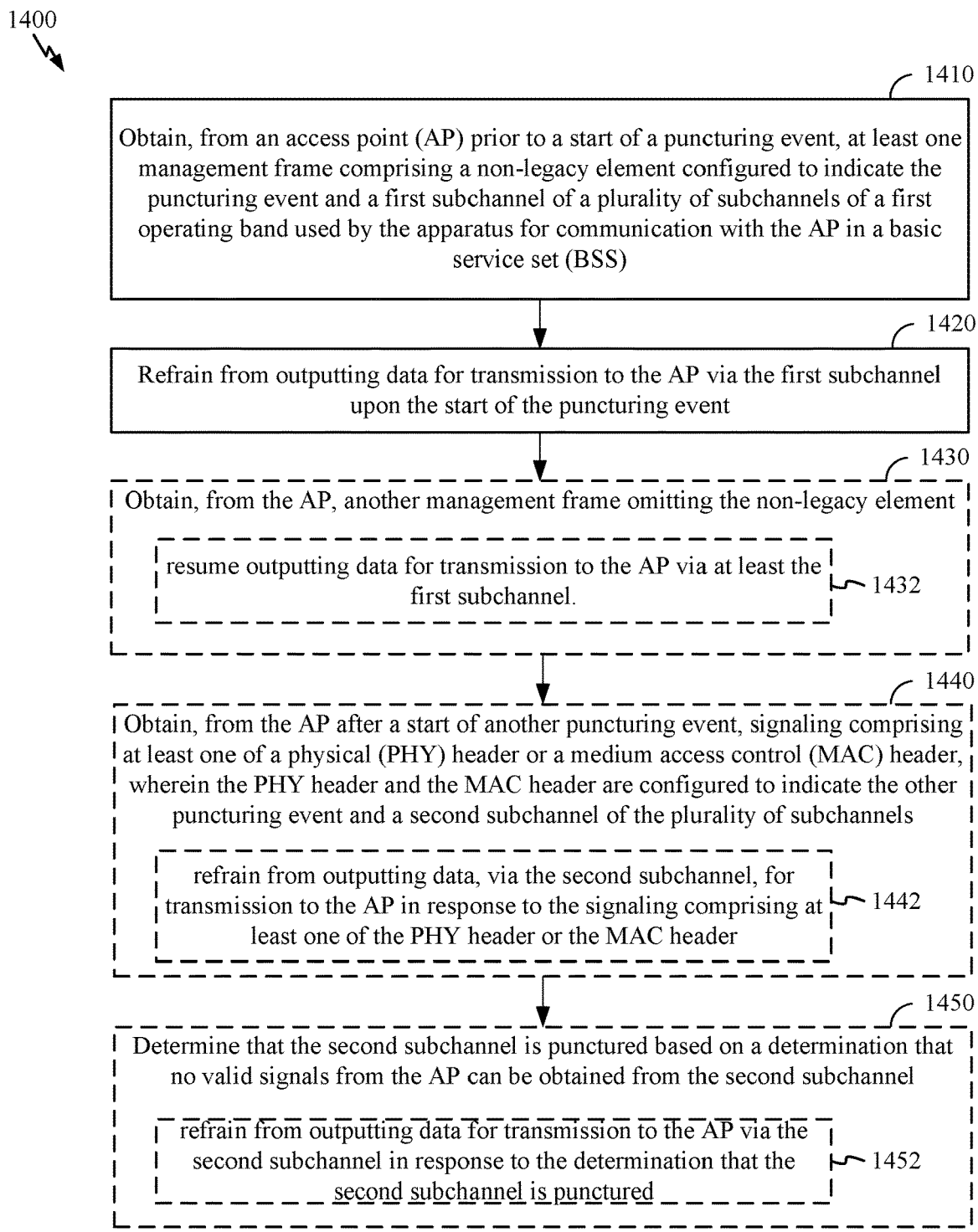
FIG. 14 is a flow diagram illustrating example operations for wireless communication, in accordance with certain aspects of the present disclosure.

FIG. 14 is a flow diagram illustrating example operations 1400 for wireless communication, in accordance with certain aspects of the present disclosure. The operations 1400 may be performed, for example, by a station (e.g., STA 104 of FIG. 1). The operations 1400 may be implemented as software components that are executed and run on one or more processors (e.g., controller 280 of FIG. 2). Further, the transmission and reception of signals by the STA in operations 1400 may be enabled, for example, by one or more antennas (e.g., antennas 252 of FIG. 2). In certain aspects, the transmission and/or reception of signals by the STA may be implemented via a bus interface of one or more processors (e.g., controller 280) obtaining and/or outputting signals.

The operations 1400 begin, at a first block 1410, by obtaining, from an access point (AP) prior to a start of a puncturing event, at least one management frame comprising a non-legacy element configured to indicate the puncturing event and a first subchannel of a plurality of subchannels of a first operating band used by the apparatus for communication with the AP in a basic service set (BSS). For example, the AP may transmit an indication to the STA, notifying the STA that a particular subchannel used by the AP and the STA will be punctured in the future. The non-legacy element may include any one or more of the non-legacy elements illustrated in FIGS. 5-9.

The operations 1400 may proceed, at a second block 1420, by refraining from outputting data for transmission to the AP via the first subchannel upon the start of the puncturing event. For example, the STA may determine to no longer transmit data over the punctured subchannel.

The operations 1400 may optionally include third block 1430, for obtaining, from the AP, another management frame omitting the non-legacy element. At sub-block 1432, the operations 1400 may resume outputting data for transmission to the AP via at least the first subchannel. For example, the AP may determine that the subchannel is no longer punctured, and the AP may notify the STAs of the BSS. For example, if the AP determines that a previously punctured subchannel is no longer punctured, the AP may transmit one or more of the legacy and/or non-legacy elements illustrated in FIGS. 5-9, but omit the bitmap (e.g., such that all the bits in the bitmap are set to "0," indicating that none of the subchannels punctured).

The operations 1400 may optionally include fourth block 1440, for obtaining, from the AP after a start of another puncturing event, signaling comprising at least one of a physical (PHY) header or a medium access control (MAC) header, wherein the PHY header and the MAC header are configured to indicate the other puncturing event and a second subchannel of the plurality of subchannels. At a sub-block 1452, the operations may also refrain from outputting data for transmission to the AP in response to the signaling comprising at least one of the PHY header or the MAC header. For example, the AP may transmit a management frame that includes the non-legacy elements illustrated in FIGS. 5-9, or include the data of the non-legacy elements in a PHY or MAC header.

The operations 1400 may optionally include fifth block 1450, for determining that the second subchannel is punctured based on a determination that no valid signals from the AP can be obtained from the second subchannel. At a sub-block 1452, the operations 1400 may refrain from outputting data for transmission to the AP via the second subchannel in response to the determination that the second subchannel is punctured. For example, if an STA does not receive an indication from the AP notifying the STA that a particular subchannel has been or will be punctured, the STA may continue to transmit on that subchannel. However, the STA may listen to the subchannels, and if it does not receive a valid symbol, or does not sense a requisite amount of energy over the subchannel, the STA mat determine that the subchannel has been punctured. In such a case, the STA may stop transmitting over the subchannel.

In certain aspects, the management frame is a probe response frame, a beacon frame, a unicast action frame, a broadcast action frame, an operating mode notification frame, a channel switch announcement frame, or a (re) association response frame.

In certain aspects, the non-legacy element comprises a first signaling field comprising a plurality of bits, and wherein each bit of the plurality of bits is configured to identify a corresponding subchannel of the first operating band. For example, one signaling field (e.g., Disabled Subchannel Bitmap element) of FIG. 5 may include a bitmap having a plurality of bits. Each bit in the bitmap may correspond to a particular subchannel, and may be used to identify whether that particular channel is punctured or not.

In certain aspects, the non-legacy element comprises a second signaling field comprising an integer value, and wherein the integer value is configured to indicate a time the puncturing event will start. For example, if the integer value received by the AP or STA is a certain value, the AP or STA may determine the puncturing event has started. For example, if the STA receives a management frame where the integer value is "1," the STA may determine that the "1" value is equal to a value (e.g., also "1") indicative of the start of the puncturing event. In some examples, the "1" may indicate that the puncturing event starts at the next time unit (e.g., TBTT).

In certain aspects, the one or more processors are further configured to cause the apparatus to obtain, from the AP over the first subchannel, repeated transmissions of the first signaling field or the second signaling field prior to the puncturing event. In some examples, the AP may transmit the indication of the puncturing event multiple times prior to the puncturing actually happening to ensure that all the STAs receive the indication. The multiple indications may also serve as a countdown with the integer value being changed with each repeated transmission of the indication.

In certain aspects, each of the plurality of transmissions is separated in time according to a periodic time interval or a dynamic time interval. In some examples, the repeated transmissions may happen at every TBTT (e.g., periodically), or dynamically.

In certain aspects, the non-legacy element comprises an integer value indicating a countdown to the start of the puncturing event. For example, the multiple indications may also serve as a countdown with the integer value being changed with each repeated transmission of the indication.

In certain aspects, the one or more processors are further configured to cause the apparatus to determine that the integer value satisfies an equality condition, wherein the satisfaction of the equality condition indicates the start of the puncturing event. For example, if the integer value received by the AP or STA is a certain value, the AP or STA may determine the puncturing event has started. For example, if the STA receives a management frame where the integer value is "1," the STA may determine that the "1" value is equal to a value (e.g., also "1") indicative of the start of the puncturing event. In some examples, the "1" may indicate that the puncturing event starts at the next time unit (e.g., TBTT).

In certain aspects, the other management frame is configured to notify the apparatus that the AP will resume transmitting data via the first subchannel. For example, the AP may determine that the subchannel is no longer punctured, and the AP may notify the STAs of the BSS. For example, if the AP determines that a previously punctured subchannel is no longer punctured, the AP may transmit one or more of the legacy and/or non-legacy elements illustrated in FIGS. 5-9, but omit the bitmap (e.g., such that all the bits in the bitmap are set to "0," indicating that none of the subchannels punctured).

In certain aspects, the management frame comprises a plurality of elements, and wherein one or more of the plurality of elements are non-legacy elements. For example, the management frame may include one or more of the fields, elements, and/or information elements (IEs) illustrated in FIGS. 5-9.

In certain aspects, a transceiver may be configured to support the operations 1400 by receiving the at least one management frame and refraining from transmitting the data, wherein the apparatus is configured as a station (STA).

Figure 15:
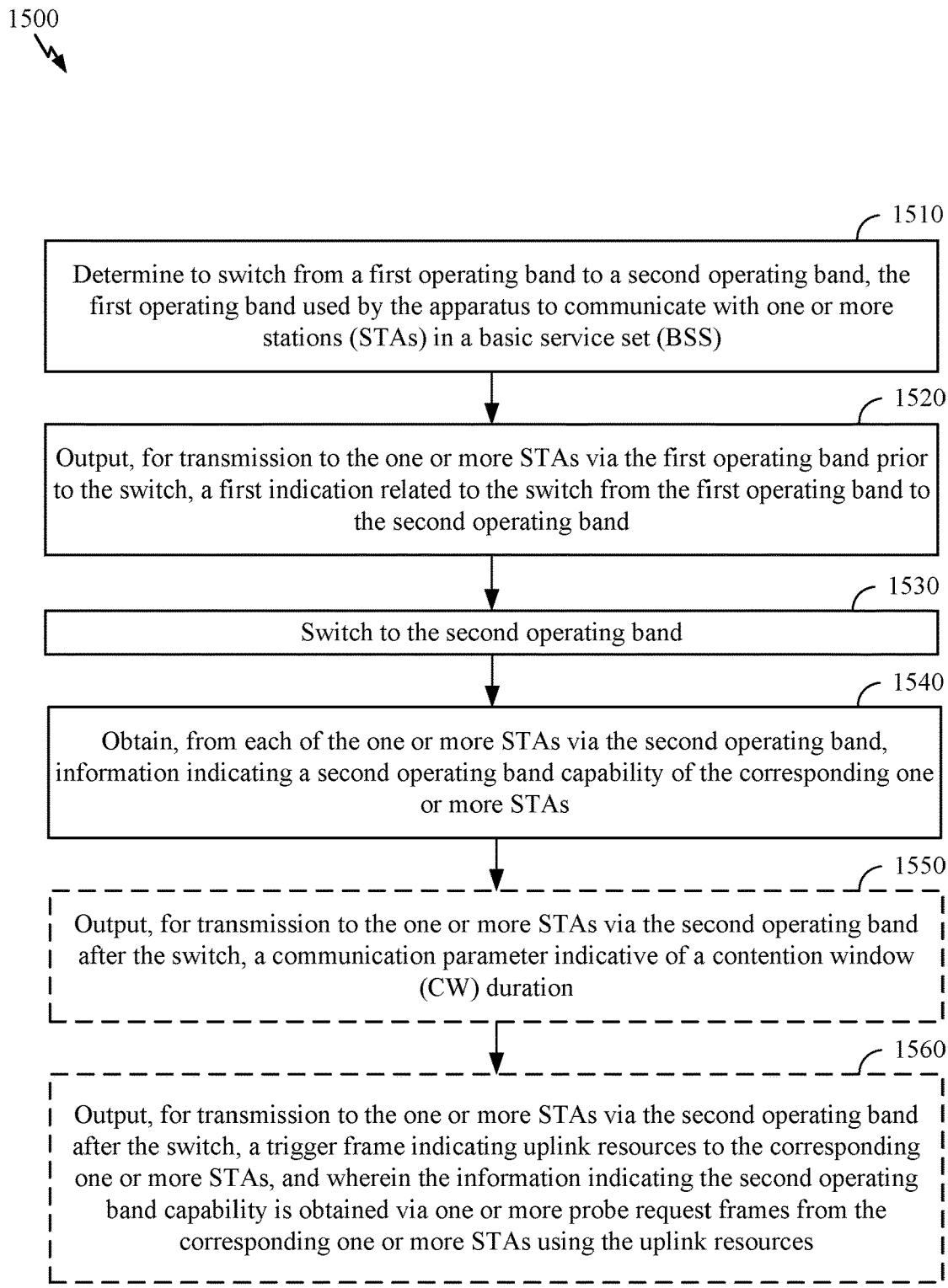
FIG. 15 is a flow diagram illustrating example operations for wireless communication, in accordance with certain aspects of the present disclosure.

FIG. 15 is a flow diagram illustrating example operations 1500 for wireless communication. The operations 1500 may be performed, for example, by an AP (e.g., such as the AP 102 of FIG. 1). The operations 1500 may be implemented as software components that are executed and run on one or more processors (e.g., controller 230 of FIG. 2). Further, the transmission and reception of signals by the AP in operations 1500 may be enabled, for example, by one or more antennas (e.g., antennas 224 of FIG. 2). In certain aspects, the transmission and/or reception of signals by the AP may be implemented via a bus interface of one or more processors (e.g., controller 230) obtaining and/or outputting signals.

The operations 1500 begin, at a first block 1510, by determining to switch from a first operating band to a second operating band, the first operating band used by the apparatus to communicate with one or more stations (STAs) in a basic service set (BSS). For example, the AP may determine to switch to another operating band due to interference on the current band, or to implement a capability only provided on the other band.

The operations 1500 may proceed, at a second block 1520, by outputting, for transmission to the one or more STAs via the first operating band prior to the switch, a first indication related to the switch from the first operating band to the second operating band. For example, the AP may notify the STAs that the AP is going to switch to a new operating band. This will provide the STAs with an opportunity to determine whether they will follow the AP to the new operating band.

The operations 1500 may proceed, at a third block 1530, by switching to the second operating band.

The operations 1500 may proceed, at a fourth block 1540, by obtaining, from each of the one or more STAs via the second operating band, information indicating a second operating band capability of the corresponding one or more STAs. For example, any STAs that switch with the AP to the new operating band, may transmit their capabilities to the AP so that the AP may determine whether the STAs are capable of communicating over the new operating band.

The operations 1500 may optionally include a fifth block 1550, for outputting, for transmission to the one or more STAs via the second operating band after the switch, a communication parameter indicative of a contention window (CW) duration. For example, after the AP has switched to the second operating band, the AP may transmit an indication of the CW duration to any STAs that followed the AP to the second operating band. In another example, the AP may convey the CW duration prior to switching to the second operating band by including the CW duration in an indication over the first operating band.

The operations 1500 may optionally include a sixth block 1560, for outputting, for transmission to the one or more STAs via the second operating band after the switch, a trigger frame indicating uplink resources to the corresponding one or more STAs, and wherein the information indicating the second operating band capability is obtained via one or more probe request frames from the corresponding one or more STAs using the uplink resources. For example, the AP may transmit a trigger frame to one or more STAs to solicit probe requests from the one or more STAs at different times to prevent a probe storm. Each trigger frame may address one or more STAs through a respective association identifier (AID), and may schedule each AID (and thus each STA) one or more resource units (RUs) that can be used by the corresponding STA to send the probe request to the AP. In some examples, the AP, before switching from the first operating band to the second operating band, may transmit an indication of the operating band switch (e.g., via management frame) wherein the indication comprises a field indicating whether the AP will transmit trigger frames to the STAs over the second operating band after the switch. The set field may be configured to prevent the STAs from transmitting a probe request to the AP after switching to the second operating band.

The operations 1500 may optionally include a seventh block 1570, for transmitting the first indication and obtaining the information indicating a second operating band capability, wherein the apparatus is configured as an access point (AP).

In certain aspects, the first indication comprises a communication parameter indicative of a contention window (CW) duration. For example, the AP may provide an indication of a CW duration, during which the STAs may transmit a probe response frame to the AP. In some examples, the AP may extend the CW duration to prevent a probe storm. In certain aspects, the CW duration may be transmitted by the AP in both the first operating band and the second operating band.

In certain aspects, the uplink resources include at least one of a random access uplink resource or an assigned uplink resource. For example, the AP may directly assign specific resources to the STAs individually, or may assign the resources using random access.

In certain aspects, the first indication comprises a communication parameter configured to prevent the one or more STAs from transmitting the information indicating the second operating band capability prior to transmission of the trigger frame. For example, the AP may prevent the STAs from causing a probe storm when they switch to the new operating band by transmitting an indication over the original operating band telling the STAs to wait for a trigger frame from the AP before making any transmissions on the new operating band.

In certain aspects, the first indication is output for transmission via a non-legacy element of a management frame. For example, the first indication may include the non-legacy elements illustrated in FIGS. 5-9, or include the data of the non-legacy elements in a PHY or MAC header.

Figure 16:
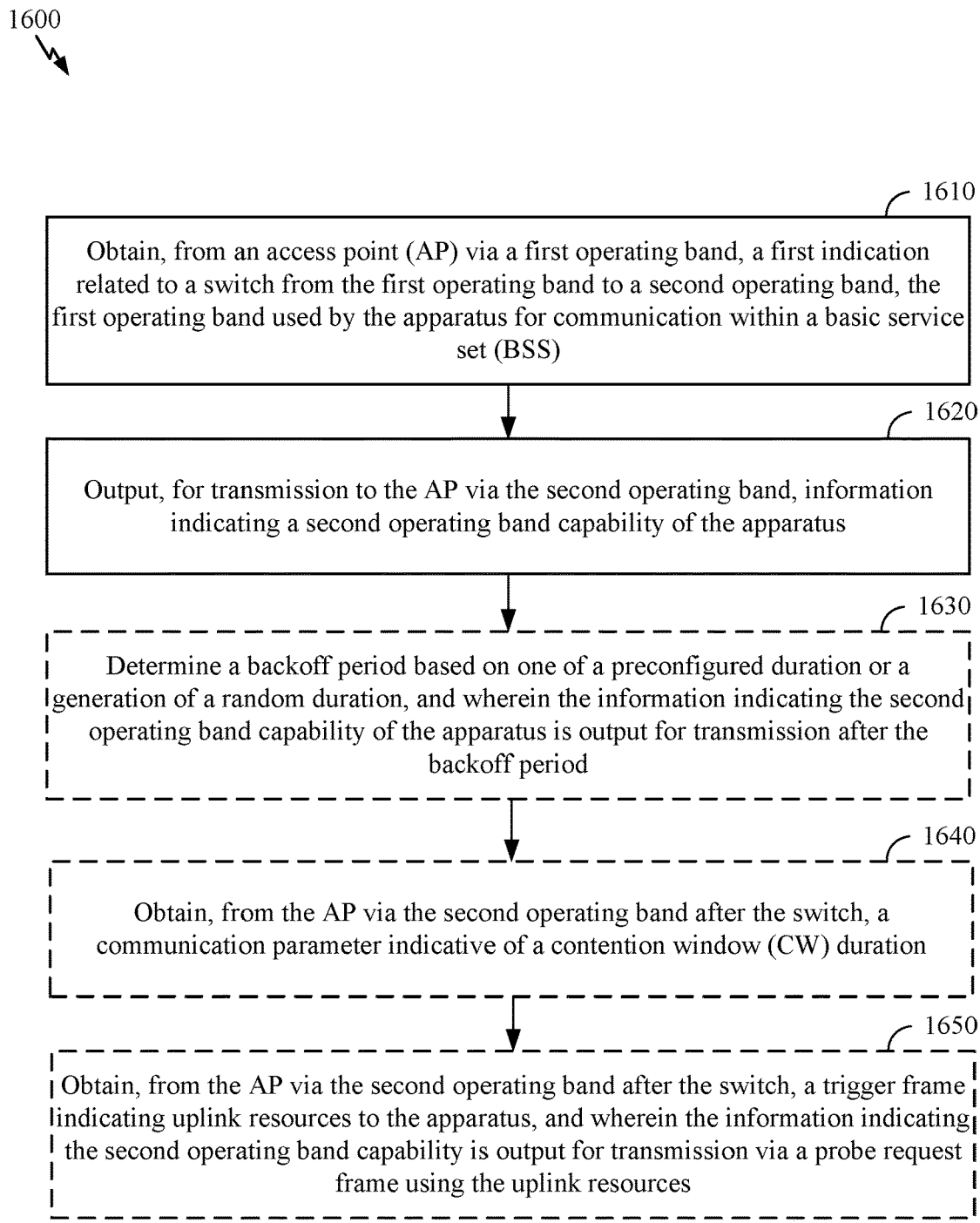
FIG. 16 is a flow diagram illustrating example operations for wireless communication, in accordance with certain aspects of the present disclosure

FIG. 16 is a flow diagram illustrating example operations 1600 for wireless communication, in accordance with certain aspects of the present disclosure. The operations 1600 may be performed, for example, by a station (e.g., STA 104 of FIG. 1). The operations 1600 may be implemented as software components that are executed and run on one or more processors (e.g., controller 280 of FIG. 2). Further, the transmission and reception of signals by the STA in operations 1600 may be enabled, for example, by one or more antennas (e.g., antennas 252 of FIG. 2). In certain aspects, the transmission and/or reception of signals by the STA may be implemented via a bus interface of one or more processors (e.g., controller 280) obtaining and/or outputting signals.

The operations 1600 begin, at a first block 1610, by obtaining, from an access point (AP) via a first operating band, a first indication related to a switch from the first operating band to a second operating band, the first operating band used by the apparatus for communication within a basic service set (BSS). For example, an AP may notify the STA that the AP is going to switch to a new operating band.

The operations 1600 may include, at a second block 1620, outputting, for transmission to the AP via the second operating band, information indicating a second operating band capability of the apparatus. For example, the STA may switch to the new operating band with the AP, and provide the AP with an indication of the STAs capabilities on the new operating band.

The operations 1600 may optionally include a third block 1630, for determining a backoff period based on one of a preconfigured duration or a generation of a random duration, and wherein the information indicating the second operating band capability of the apparatus is output for transmission after the backoff period. For example, an STA may randomly generate a backoff period, during which the STA waits until then end of the backoff period to transmit a probe to the AP on the new bandwidth. In one example, the AP may provide the STA with EDCA parameters indicating the duration of the CW. In response, each STA may generate a random backoff period falling between the time of the switch to the second operating band and the end of the CW. In some examples, the AP may preconfigure one or more STAs with a backoff period via a management frame transmitted over the first operating band and/or the second operating band. It should be noted that one or more of the first technique, the second technique and the third technique may be used by the AP and STAs to prevent a probe storm after switching to a new operating band.

The operations 1600 may optionally include a fourth block 1640, for obtaining, from the AP via the second operating band after the switch, a communication parameter indicative of a contention window (CW) duration. For example, the AP may transmit an indication of a CW duration to the STA after the STA switches to the new operating band. In another example, the AP may convey the CW duration prior to switching to the second operating band by including the CW duration in an indication over the first operating band.

The operations 1600 may optionally include a fifth block 1650, for obtaining, from the AP via the second operating band after the switch, a trigger frame indicating uplink resources to the apparatus, and wherein the information indicating the second operating band capability is output for transmission via a probe request frame using the uplink resources. For example, the AP may transmit a trigger frame to one or more STAs to solicit probe requests from the one or more STAs at different times to prevent a probe storm. Each trigger frame may address one or more STAs through a respective association identifier (AID), and may schedule each AID (and thus each STA) one or more resource units (RUs) that can be used by the corresponding STA to send the probe request to the AP. In some examples, the AP, before switching from the first operating band to the second operating band, may transmit an indication of the operating band switch (e.g., via management frame) wherein the indication comprises a field indicating whether the AP will transmit trigger frames to the STAs over the second operating band after the switch. The set field may be configured to prevent the STAs from transmitting a probe request to the AP after switching to the second operating band.

In certain aspects, the first indication comprises a management frame comprising the preconfigured duration. For example, the AP may broadcast the preconfigured duration to multiple STAs.

In certain aspects, the first indication comprises a communication parameter indicative of a contention window (CW) duration. For example, the AP may transmit an indication of a CW to one or more STAs before, after, or both, the switch from the original operating band to the new operating band.

In certain aspects, the uplink resources include one or more of a random access uplink resource or an assigned uplink resource. For example, the AP may directly assign specific resources to the STAs individually, or may assign the resources using random access.

In certain aspects, the first indication comprises a communication parameter configured to prevent the apparatus from outputting for transmission the information indicating the second operating band capability prior to obtaining the trigger frame. For example, the AP may transmit a trigger frame to one or more STAs to solicit probe requests from the one or more STAs at different times to prevent a probe storm. Each trigger frame may address one or more STAs through a respective association identifier (AID), and may schedule each AID (and thus each STA) one or more resource units (RUs) that can be used by the corresponding STA to send the probe request to the AP. In some examples, the AP, before switching from the first operating band to the second operating band, may transmit an indication of the operating band switch (e.g., via management frame) wherein the indication comprises a field indicating whether the AP will transmit trigger frames to the STAs over the second operating band after the switch. The set field may be configured to prevent the STAs from transmitting a probe request to the AP after switching to the second operating band.

In certain aspects, the information indicating a second operating band capability of the apparatus is output, for transmission to the AP via the second operating band, in response to the trigger frame. For example, the AP may prevent the STA from immediately transmitting a probe to the AP upon switching operating bands. Instead, the STA may be assigned, by the AP, resources for the probe transmission via a trigger frame.

In certain aspects, the first indication is obtained via a management frame comprising a non-legacy element configured to indicate the switch from the first operating band to the second operating band. For example, the first indication may include the non-legacy elements illustrated in FIGS. 5-9, or include the data of the non-legacy elements in a PHY or MAC header.

Example Wireless Communication Device

Figure 17:
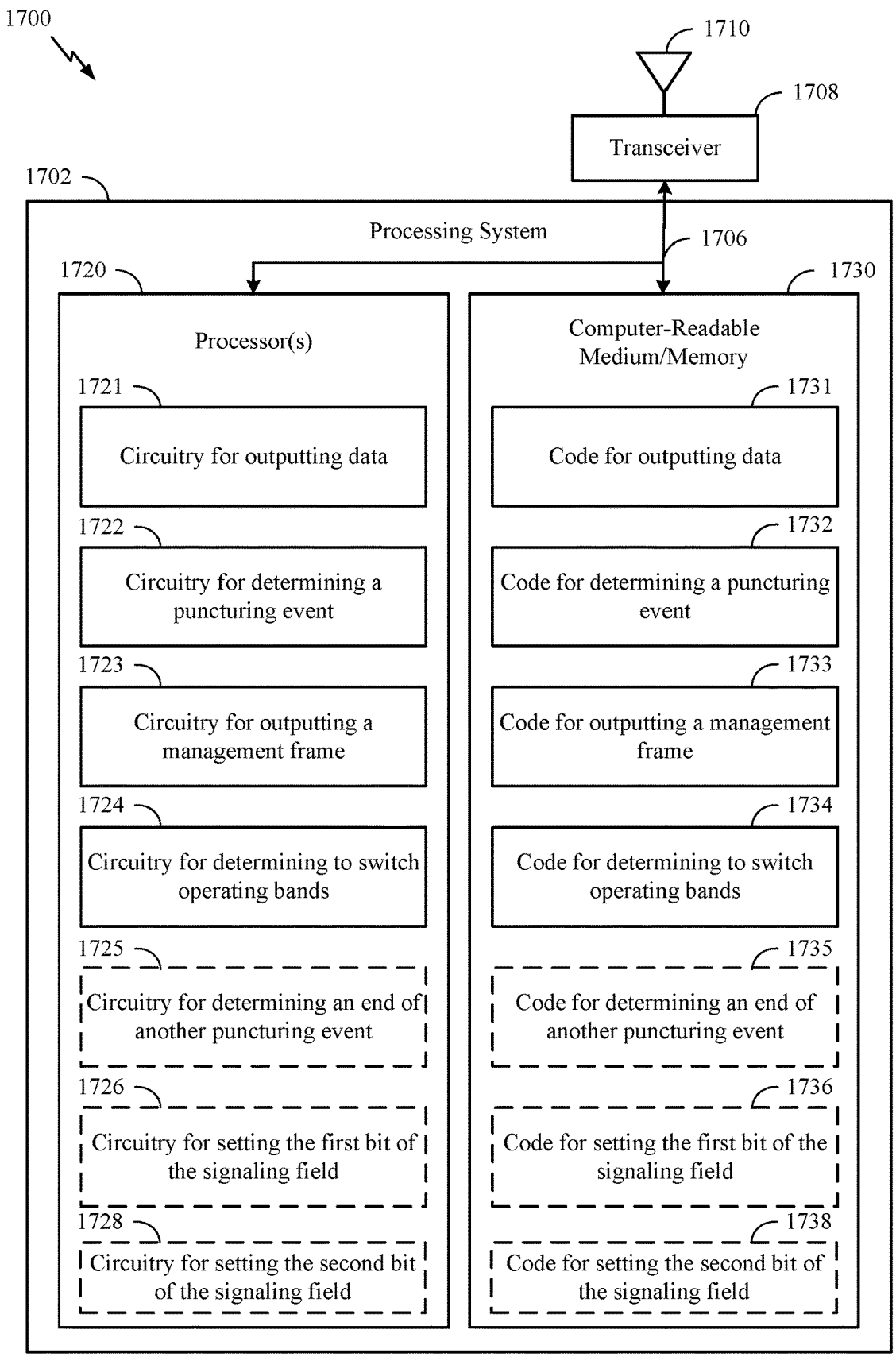
FIG. 17 illustrates a communications device that may include various components (e.g., corresponding to means-plus-function components) configured to perform operations for the techniques disclosed herein.

FIG. 17 depicts an example communications device 1700 that includes various components operable, configured, or adapted to perform operations for the techniques disclosed herein, such as the operations depicted and described with respect to FIG. 13. In some examples, communication device 1700 may be an AP 102 as described, for example with respect to FIGS. 1 and 2.

Communications device 1700 includes a processing system 1702 coupled to a transceiver 1708 (e.g., a transmitter and/or a receiver). Transceiver 1708 is configured to transmit (or send) and receive signals for the communications device 1700 via an antenna 1710, such as the various signals as described herein. Processing system 1702 may be configured to perform processing functions for communications device 1700, including processing signals received and/or to be transmitted by communications device 1700.

Processing system 1702 includes one or more processors 1720 coupled to a computer-readable medium/memory 1730 via a bus 1706. In certain aspects, computer-readable medium/memory 1730 is configured to store instructions (e.g., computer-executable code) that when executed by the one or more processors 1720, cause the one or more processors 1720 to perform the operations illustrated in FIG. 13, or other operations for performing the various techniques discussed herein.

In the depicted example, computer-readable medium/memory 1730 stores code 1731 for outputting data, code 1732 for determining a puncturing event, code 1733 for outputting a management frame, code 1734 for determining to switch operating bands, code 1735 for determining an end of another puncturing event, code 1736 for setting the first bit of the signaling field, and code 1738 for setting the second bit of the signaling field.

In the depicted example, the one or more processors 1720 include circuitry configured to implement the code stored in the computer-readable medium/memory 1730, including circuitry 1721 for outputting data, circuitry 1722 for determining a puncturing event, circuitry 1723 for outputting a management frame, circuitry 1724 for determining to switch operating bands, circuitry 1725 for determining an end of another puncturing event, code 1726 for setting the first bit of the signaling field, and code 1728 for setting the second bit of the signaling field.

Various components of communications device 1700 may provide means for performing the methods described herein, including with respect to FIG. 13.

In some examples, means for transmitting, outputting, or sending (or means for outputting for transmission) may include the transceivers 232 and/or antenna(s) 224 of the AP 102 illustrated in FIG. 2 and/or transceiver 1708 and antenna 1710 of the communication device 1700 in FIG. 17.

In some examples, means for receiving (or means for obtaining) may include the transceivers 222 and/or antenna (s) 224 of the AP illustrated in FIG. 2 and/or transceiver 1708 and antenna 1710 of the communication device 1700 in FIG. 17.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for determining, means for obtaining, means for sending, means for refraining from outputting, means for switching, means for setting, and means for selecting, may include various processing system components, such as: the one or more processors 1720 in FIG. 17, or aspects of the AP 102 depicted in FIG. 2, including receive processor 240, transmit processor 220, TX data processor 210, and/or controller 230.

Notably, FIG. 17 is an example, and many other examples and configurations of communication device 1700 are possible.

Figure 18:
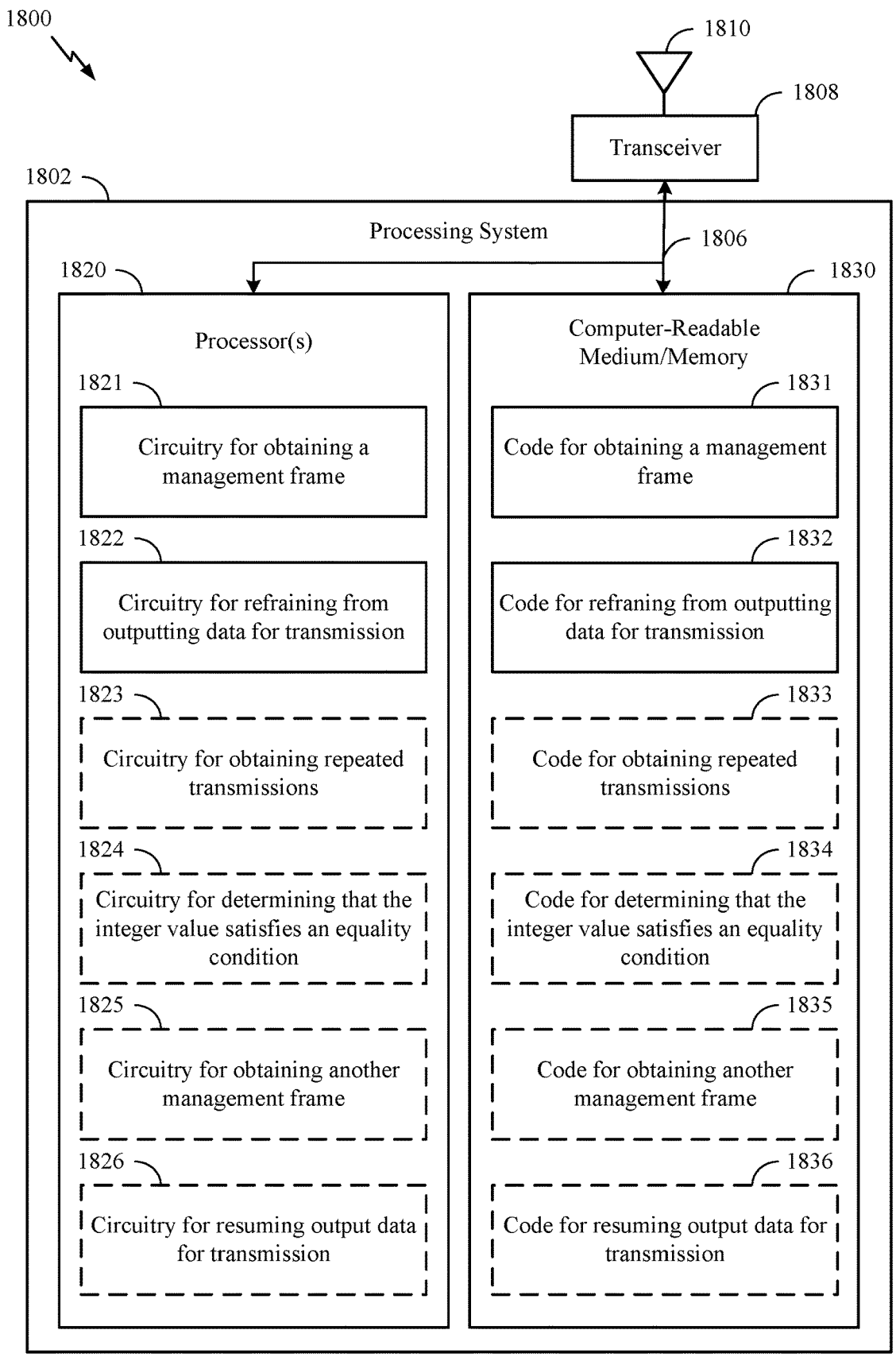
FIG. 18 illustrates a communications device that may include various components (e.g., corresponding to means-plus-function components) configured to perform operations for the techniques disclosed herein.

FIG. 18 depicts an example communications device 1800 that includes various components operable, configured, or adapted to perform operations for the techniques disclosed herein, such as the operations depicted and described with respect to FIG. 14. In some examples, communication device 1800 may be an STA 104 as described, for example with respect to FIGS. 1 and 2.

Communications device 1800 includes a processing system 1802 coupled to a transceiver 1808 (e.g., a transmitter and/or a receiver). Transceiver 1808 is configured to transmit (or send) and receive signals for the communications device 1800 via an antenna 1810, such as the various signals as described herein. Processing system 1802 may be configured to perform processing functions for communications device 1800, including processing signals received and/or to be transmitted by communications device 1800.

Processing system 1802 includes one or more processors 1820 coupled to a computer-readable medium/memory 1830 via a bus 1806. In certain aspects, computer-readable medium/memory 1830 is configured to store instructions (e.g., computer-executable code) that when executed by the one or more processors 1820, cause the one or more processors 1820 to perform the operations illustrated in FIG. 14, or other operations for performing the various techniques discussed herein.

In the depicted example, computer-readable medium/memory 1830 stores code 1831 for obtaining a management frame, code 1832 for refraining from outputting data for transmission, code 1833 for obtaining repeated transmissions, code 1834 for determining that the integer value satisfies an equality condition, code 1835 for obtaining another management frame, code 1836 for resuming output data for transmission.

In the depicted example, the one or more processors 1820 include circuitry configured to implement the code stored in the computer-readable medium/memory 1830, including circuitry 1821 for obtaining a management frame, circuitry 1822 for refraining from outputting data for transmission, circuitry 1823 for obtaining repeated transmissions, code 1824 for determining that the integer value satisfies an equality condition, code 1825 for obtaining another management frame, code 1826 for resuming output data for transmission.

Various components of communications device 1800 may provide means for performing the methods described herein, including with respect to FIG. 14.

In some examples, means for transmitting, outputting, or sending (or means for outputting for transmission) may include the transceivers 254 and/or antenna(s) 254 of the STAs 104a and 104x illustrated in FIG. 2 and/or transceiver 1808 and antenna 1810 of the communication device 1800 in FIG. 18.

In some examples, means for receiving (or means for obtaining) may include the transceivers 254 and/or antenna (s) 252 of the STAs illustrated in FIG. 2 and/or transceiver 1808 and antenna 1810 of the communication device 1800 in FIG. 18.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for determining, means for obtaining, means for sending, means for refraining from outputting, means for switching, means for setting, and means for selecting, may include various processing system components, such as: the one or more processors 1820 in FIG. 18, or aspects of the STAs 104 depicted in FIG. 2, including receive processor 260, transmit processor 290, TX data processor 288, and/or controller 280.

Notably, FIG. 18 is an example, and many other examples and configurations of communication device 1800 are possible.

Figure 19:
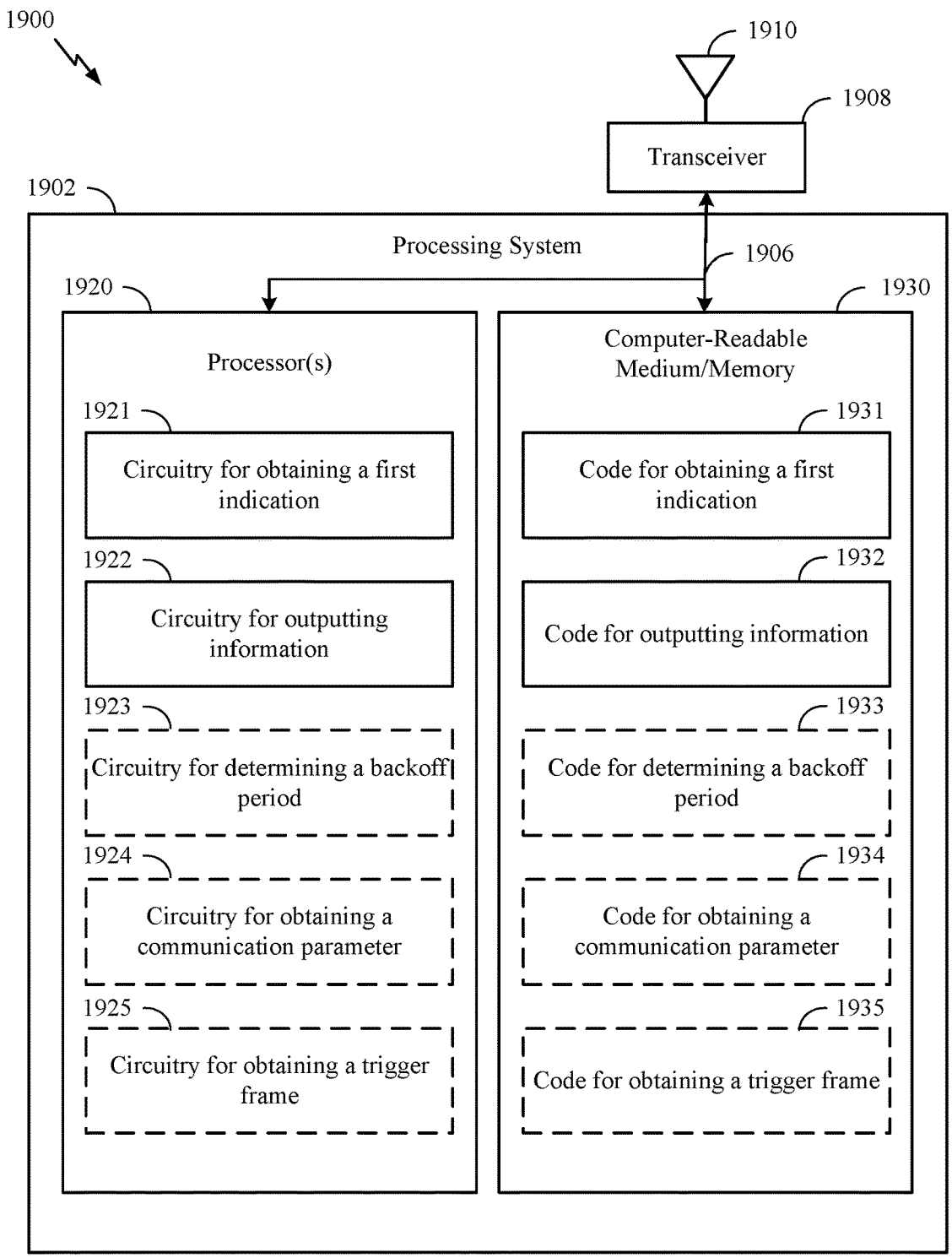
FIG. 19 illustrates a communications device that may include various components (e.g., corresponding to means-plus-function components) configured to perform operations for the techniques disclosed herein.

FIG. 19 depicts an example communications device 1900 that includes various components operable, configured, or adapted to perform operations for the techniques disclosed herein, such as the operations depicted and described with respect to FIG. 15. In some examples, communication device 1900 may be an AP 102 as described, for example with respect to FIGS. 1 and 2.

Communications device 1900 includes a processing system 1902 coupled to a transceiver 1908 (e.g., a transmitter and/or a receiver). Transceiver 1908 is configured to transmit (or send) and receive signals for the communications device 1900 via an antenna 1910, such as the various signals as described herein. Processing system 1902 may be configured to perform processing functions for communications device 1900, including processing signals received and/or to be transmitted by communications device 1900.

Processing system 1902 includes one or more processors 1920 coupled to a computer-readable medium/memory 1930 via a bus 1906. In certain aspects, computer-readable medium/memory 1930 is configured to store instructions (e.g., computer-executable code) that when executed by the one or more processors 1920, cause the one or more processors 1920 to perform the operations illustrated in FIG. 15, or other operations for performing the various techniques discussed herein.

In the depicted example, computer-readable medium/memory 1930 stores code 1931 for determining to switch operating bands, code 1932 for outputting a switch indication, code 1933 for switching operating bands, code 1934 for obtaining information, code 1935 for outputting a communication parameter, and code 1936 for outputting a trigger frame.

In the depicted example, the one or more processors 1920 include circuitry configured to implement the code stored in the computer-readable medium/memory 1930, including circuitry 1921 for determining to switch operating bands, circuitry 1922 for outputting a switch indication, circuitry 1923 for switching operating bands, circuitry 1924 for obtaining information, circuitry 1925 for outputting a communication parameter, and circuitry 1926 for outputting a trigger frame.

Various components of communications device 1900 may provide means for performing the methods described herein, including with respect to FIG. 15.

In some examples, means for transmitting, outputting, or sending (or means for outputting for transmission) may include the transceivers 232 and/or antenna(s) 224 of the AP 102 illustrated in FIG. 2 and/or transceiver 1908 and antenna 1910 of the communication device 1900 in FIG. 19.

In some examples, means for receiving (or means for obtaining) may include the transceivers 222 and/or antenna(s) 224 of the AP illustrated in FIG. 2 and/or transceiver 1908 and antenna 1910 of the communication device 1900 in FIG. 19.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for determining, means for obtaining, means for sending, means for refraining from outputting, means for switching, means for setting, and means for selecting, may include various processing system components, such as: the one or more processors 1920 in FIG. 19, or aspects of the AP 102 depicted in FIG. 2, including receive processor 240, transmit processor 220, TX data processor 210, and/or controller 230.

Notably, FIG. 19 is an example, and many other examples and configurations of communication device 1900 are possible.

Figure 20:
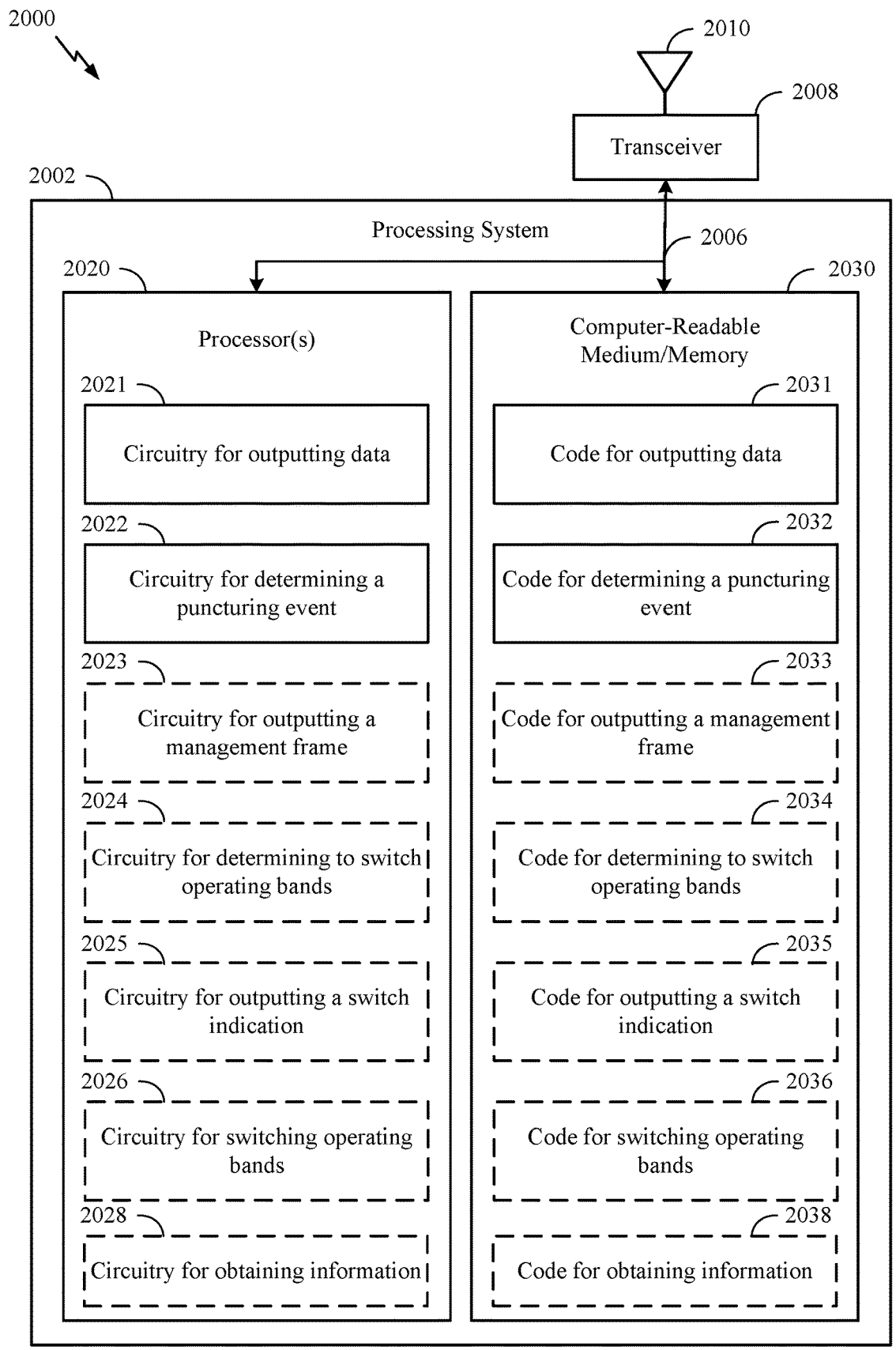
FIG. 20 illustrates a communications device that may include various components (e.g., corresponding to means-plus-function components) configured to perform operations for the techniques disclosed herein Like reference numbers and designations in the various drawings indicate like elements.

FIG. 20 depicts an example communications device 2000 that includes various components operable, configured, or adapted to perform operations for the techniques disclosed herein, such as the operations depicted and described with respect to FIG. 16. In some examples, communication device 2000 may be an STA 104 as described, for example with respect to FIGS. 1 and 2.

Communications device 2000 includes a processing system 2002 coupled to a transceiver 2008 (e.g., a transmitter and/or a receiver). Transceiver 2008 is configured to transmit (or send) and receive signals for the communications device 2000 via an antenna 2010, such as the various signals as described herein. Processing system 2002 may be configured to perform processing functions for communications device 2000, including processing signals received and/or to be transmitted by communications device 2000.

Processing system 2002 includes one or more processors 2020 coupled to a computer-readable medium/memory 2030 via a bus 2006. In certain aspects, computer-readable medium/memory 2030 is configured to store instructions (e.g., computer-executable code) that when executed by the one or more processors 2020, cause the one or more processors 2020 to perform the operations illustrated in FIG. 16, or other operations for performing the various techniques discussed herein.

In the depicted example, computer-readable medium/memory 2030 stores code 2031 for obtaining a first indication, code 2032 for outputting information, code 2033 for determining a backoff period, code 2034 for obtaining a communication parameter, and code 2035 for obtaining a trigger frame.

In the depicted example, the one or more processors 2020 include circuitry configured to implement the code stored in the computer-readable medium/memory 2030, including circuitry 2021 for obtaining a first indication, circuitry 2022 for outputting information, circuitry 2023 for determining a backoff period, code 2024 for obtaining a communication parameter, and code 2025 for obtaining a trigger frame.

Various components of communications device 2000 may provide means for performing the methods described herein, including with respect to FIG. 16.

In some examples, means for transmitting, outputting, or sending (or means for outputting for transmission) may include the transceivers 254 and/or antenna(s) 254 of the STAs 104*a* and 104*x* illustrated in FIG. 2 and/or transceiver 2008 and antenna 2010 of the communication device 2000 in FIG. 20.

In some examples, means for receiving (or means for obtaining) may include the transceivers 254 and/or antenna(s) 252 of the STAs illustrated in FIG. 2 and/or transceiver 2008 and antenna 2010 of the communication device 2000 in FIG. 20.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for determining, means for obtaining, means for sending, means for refraining from outputting, means for switching, means for setting, and means for selecting, may include various processing system components, such as: the one or more processors 2020 in FIG. 20, or aspects of the STAs 104 depicted in FIG. 2, including receive processor 260, transmit processor 290, TX data processor 288, and/or controller 280.

Notably, FIG. 20 is an example, and many other examples and configurations of communication device 2000 are possible.

Example Aspects

Aspect 1: A method for wireless communications at an access point (AP), comprising: outputting data for transmission to one or more stations (STAs) in a basic service set (BSS) via a first operating band comprising at least a first subchannel; determining a puncturing event starting in the future, the puncturing event being associated with the first subchannel; outputting, for transmission prior to the start of the puncturing event, at least one management frame to the one or more STAs, wherein the at least one management frame comprises a non-legacy element configured to indicate the puncturing event and the first subchannel; and refraining from outputting data for transmission to the one or more STAs via the first subchannel upon the start of the puncturing event.

Aspect 2: The method of aspect 1, wherein the management frame is a probe response frame, a beacon frame, a unicast action frame, a broadcast action frame, an operating mode notification frame, a channel switch announcement frame, or a (re)association response frame.

Aspect 3: The method of any of aspect 1 and aspect 2, wherein the non-legacy element comprises a first signaling field comprising a plurality of bits, and wherein each bit of the plurality of bits is configured to identify a corresponding subchannel of the first operating band.

Aspect 4: The method of any of aspects 1-3, wherein the first operating band comprises at least the first subchannel and a second subchannel, wherein a first bit of the signaling field corresponds to the first subchannel, and a second bit of the signaling field corresponds to the second subchannel, and wherein the method further comprises: determining an end of another puncturing event being associated with the second subchannel; setting the first bit of the signaling field to indicate the start of the puncturing event associated with the first subchannel; and setting the second bit of the signaling field to indicate the end of the other puncturing event associated with the second subchannel.

Aspect 5: The method of aspect 3, further comprising obtaining signaling from a first STA of the one or more STAs via the first subchannel after the start of the puncturing event; and in response to the obtained signaling, outputting for transmission the first signaling field to the first STA via a management frame.

Aspect 6: The method of aspect 3, wherein the non-legacy element comprises a second signaling field comprising an integer value, and wherein the integer value is configured to indicate a time the puncturing event will start.

Aspect 7: The method of any of aspects 1-6, wherein at least one of the first signaling field or the second signaling field is repeated in a plurality of transmissions prior to the puncturing event.

Aspect 8: The method of any of aspects 1-7, wherein each of the plurality of transmissions is separated in time according to a periodic time interval or a dynamic time interval.

Aspect 9: The method of any of aspects 1-8, wherein the integer value is further configured to indicate a countdown time to the start of the puncturing event.

Aspect 10: The method of any of aspects 1-9, further comprising determining that the integer value satisfies an equality condition, wherein the satisfaction of the equality condition indicates the start of the puncturing event.

Aspect 11: The method of any of aspects 1-10, further comprising determining an end of the puncturing event associated with the first subchannel; outputting, for transmission, another management frame to the one or more STAs in response to the determining the end of the puncturing event, wherein the other management frame omits the non-legacy element; and resuming outputting data for transmission to the one or more STAs via at least the first subchannel.

Aspect 12: The method of aspect 11, wherein the other management frame is configured to notify the one or more STAs that the AP will resume outputting data for transmission via the first subchannel.

Aspect 13: The method of any of aspects 1-12, wherein the management frame comprises a plurality of elements, and wherein one or more of the plurality of elements are non-legacy elements.

Aspect 14: A method for wireless communications at a station (STA), comprising: obtaining, from an access point (AP) prior to a start of a puncturing event, at least one management frame comprising a non-legacy element configured to indicate the puncturing event and a first subchannel of a plurality of subchannels of a first operating band used by the STA for communication with the AP in a basic service set (BSS); and refraining from outputting data for transmission to the AP via the first subchannel upon the start of the puncturing event.

Aspect 15: The method of aspect 14, wherein the management frame is a probe response frame, a beacon frame, a unicast action frame, a broadcast action frame, an operating mode notification frame, a channel switch announcement frame, or a (re)association response frame.

Aspect 16: The method of any of aspects 14 and 15, wherein the non-legacy element comprises a first signaling field comprising a plurality of bits, and wherein each bit of the plurality of bits is configured to identify a corresponding subchannel of the first operating band.

Aspect 17: The method of any of aspects 14-16, wherein the non-legacy element comprises a second signaling field comprising an integer value, and wherein the integer value is configured to indicate a time the puncturing event will start.

Aspect 18: The method of any of aspects 14-17, further comprising obtaining, from the AP over the first subchannel, repeated transmissions of the first signaling field or the second signaling field prior to the puncturing event.

Aspect 19: The method of any of aspects 14-18, wherein each of the plurality of transmissions is separated in time according to a periodic time interval or a dynamic time interval.

Aspect 20: The method of any of aspects 14-19, wherein the non-legacy element comprises an integer value indicating a countdown to the start of the puncturing event.

Aspect 21: The method of any of aspects 14-20, further comprising determining that the integer value satisfies an equality condition, wherein the satisfaction of the equality condition indicates the start of the puncturing event.

Aspect 22: The method of any of aspects 14-21, further comprising obtaining, from the AP, another management frame omitting the non-legacy element; and resuming outputting data for transmission to the AP via at least the first subchannel.

Aspect 23: The method of any of aspects 14-22, wherein the other management frame is configured to notify the STA that the AP will resume transmitting data via the first subchannel.

Aspect 24: The method of any of aspects 14-23, wherein the management frame comprises a plurality of elements, and wherein one or more of the plurality of elements are non-legacy elements.

Aspect 25: The method of any of aspects 14-24, further comprising: obtaining, from the AP after a start of another puncturing event, signaling comprising at least one of a physical (PHY) header or a medium access control (MAC) header, wherein the PHY header and the MAC header are configured to indicate the other puncturing event and a second subchannel of the plurality of subchannels; and refraining from outputting data for transmission to the AP in response to the signaling comprising at least one of the PHY header or the MAC header.

Aspect 26: The method of any of aspects 14-25, wherein the plurality of subchannels include a second subchannel, and wherein the method further comprises: determining that the second subchannel is punctured based on a determination that no valid signals from the AP can be obtained from the second subchannel; and refraining from outputting data for transmission to the AP via the second subchannel in response to the determination that the second subchannel is punctured.

Aspect 27: A method for wireless communications at an access point (AP), comprising: determining to switch from a first operating band to a second operating band, the first operating band used by the AP to communicate with one or more stations (STAs) in a basic service set (BSS); outputting, for transmission to the one or more STAs via the first operating band prior to the switch, a first indication related to the switch from the first operating band to the second operating band; switching to the second operating band; and obtaining, from each of the one or more STAs via the second operating band, information indicating a second operating band capability of the corresponding one or more STAs.

Aspect 28: The method of aspect 27, wherein the first indication comprises a communication parameter indicative of a contention window (CW) duration.

Aspect 29: The method of any of aspects 27 and 28, further comprising outputting, for transmission to the one or more STAs via the second operating band after the switch, a communication parameter indicative of a contention window (CW) duration.

Aspect 30: The method of any of aspects 27-29, wherein the first indication comprises the communication parameter indicative of the contention window (CW) duration.

Aspect 31: The method of any of aspects 27-30, wherein the one or more processors are further configured to cause the AP to output, for transmission to the one or more STAs via the second operating band after the switch, a trigger frame indicating uplink resources to the corresponding one or more STAs, and wherein the information indicating the second operating band capability is obtained via one or more probe request frames from the corresponding one or more STAs using the uplink resources.

Aspect 32: The method of any of aspects 27-31, wherein the uplink resources include at least one of a random access uplink resource or an assigned uplink resource.

Aspect 33: The method of any of aspects 27-32, wherein the first indication comprises a communication parameter configured to prevent the one or more STAs from transmitting the information indicating the second operating band capability prior to transmission of the trigger frame.

Aspect 34: The method of any of aspects 27-33, wherein the first indication is output for transmission via a non-legacy element of a management frame.

Aspect 35: A method for wireless communications at a station (STA), comprising: obtaining, from an access point (AP) via a first operating band, a first indication related to a switch from the first operating band to a second operating band, the first operating band used by the STA for communication within a basic service set (BSS); and outputting, for transmission to the AP via the second operating band, information indicating a second operating band capability of the STA.

Aspect 36: The method of aspect 35, wherein the one or more processors are further configured to cause the STA to determine a backoff period based on one of a preconfigured duration or a generation of a random duration, and wherein the information indicating the second operating band capability of the STA is output for transmission after the backoff period.

Aspect 37: The method of any of aspects 35 and 36, wherein the first indication comprises a management frame comprising the preconfigured duration.

Aspect 38: The method of any of aspects 35-37, wherein the first indication comprises a communication parameter indicative of a contention window (CW) duration.

Aspect 39: The method of any of aspects 35-38, further comprising obtaining, from the AP via the second operating band after the switch, a communication parameter indicative of a contention window (CW) duration.

Aspect 40: The method of any of aspects 35-39, wherein the first indication comprises the communication parameter indicative of the contention window (CW) duration.

Aspect 41: The method of any of aspects 35-40, further comprising obtaining, from the AP via the second operating band after the switch, a trigger frame indicating uplink resources to the STA, and wherein the information indicating the second operating band capability is output for transmission via a probe request frame using the uplink resources.

Aspect 42: The method of any of aspects 35-41, wherein the uplink resources include one or more of a random access uplink resource or an assigned uplink resource.

Aspect 43: The method of any of aspects 35-42, wherein the first indication comprises a communication parameter configured to prevent the STA from outputting for transmission the information indicating the second operating band capability prior to obtaining the trigger frame.

Aspect 44: The method of any of aspects 35-43, wherein the information indicating a second operating band capability of the STA is output, for transmission to the AP via the second operating band, in response to the trigger frame.

Aspect 45: The method of any of aspects 35-44, wherein the first indication is obtained via a management frame comprising a non-legacy element configured to indicate the switch from the first operating band to the second operating band.

Aspect 46: An apparatus for wireless communications, comprising: a memory comprising instructions; and one or more processors configured to execute the instructions and cause the apparatus to perform a method in accordance with any one of Aspects 1-13.

Aspect 47: An apparatus for wireless communications, comprising: a memory comprising instructions; and one or more processors configured to execute the instructions and cause the apparatus to perform a method in accordance with any one of Aspects 14-26.

Aspect 48: An apparatus for wireless communications, comprising: a memory comprising instructions; and one or more processors configured to execute the instructions and cause the apparatus to perform a method in accordance with any one of Aspects 27-34.

Aspect 49: An apparatus for wireless communications, comprising: a memory comprising instructions; and one or more processors configured to execute the instructions and cause the apparatus to perform a method in accordance with any one of Aspects 35-45.

Aspect 50: An access point (AP), comprising: at least one transceiver; a memory comprising instructions; and one or more processors configured to execute the instructions and cause the AP to perform a method in accordance with any one of Aspects 1-13, wherein the at least one transceiver is configured to receive the frame or transmit at least the portion of the frame.

Aspect 51: An access point (AP), comprising: at least one transceiver; a memory comprising instructions; and one or more processors configured to execute the instructions and cause the AP to perform a method in accordance with any one of Aspects 27-34, wherein the at least one transceiver is configured to receive the frame or transmit at least the portion of the frame.

Aspect 52: A station (STA), comprising: at least one transceiver; a memory comprising instructions; and one or more processors configured to execute the instructions and cause the STA to perform a method in accordance with any one of Aspects 14-26, wherein the at least one transceiver is configured to output the frame for transmission.

Aspect 53: A station (STA), comprising: at least one transceiver; a memory comprising instructions; and one or more processors configured to execute the instructions and cause the STA to perform a method in accordance with any one of Aspects 35-45, wherein the at least one transceiver is configured to output the frame for transmission.

Aspect 54: An apparatus for wireless communications, comprising means for performing a method in accordance with any one of Aspects 1-13.

Aspect 55: An apparatus for wireless communications, comprising means for performing a method in accordance with any one of Aspects 14-26.

Aspect 56: An apparatus for wireless communications, comprising means for performing a method in accordance with any one of Aspects 27-34.

Aspect 57: An apparatus for wireless communications, comprising means for performing a method in accordance with any one of Aspects 35-45.

Aspect 58: A non-transitory computer-readable medium comprising instructions that, when executed by an apparatus, cause the apparatus to perform a method in accordance with any one of Aspects 1-13.

Aspect 59: A non-transitory computer-readable medium comprising instructions that, when executed by an apparatus, cause the apparatus to perform a method in accordance with any one of Aspects 14-26.

Aspect 60: A non-transitory computer-readable medium comprising instructions that, when executed by an apparatus, cause the apparatus to perform a method in accordance with any one of Aspects 27-34.

Aspect 61: A non-transitory computer-readable medium comprising instructions that, when executed by an apparatus, cause the apparatus to perform a method in accordance with any one of Aspects 35-45.

Additional Considerations

The preceding description provides examples of techniques for increasing local area network (LAN) device privacy in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications, comprising:
    memory comprising instructions; and
    one or more processors configured to execute the instructions and cause the apparatus to:
        output data for transmission to one or more stations (STAs) in a basic service set (BSS) via a first operating band comprising at least a first subchannel;
        output, for transmission prior to a start of a puncturing event associated with the first subchannel, at least one management frame to the one or more STAs, wherein the at least one management frame comprises a non-legacy element configured to indicate the puncturing event and the first subchannel; and
        refrain from outputting data for transmission to the one or more STAs via the first subchannel upon the start of the puncturing event.

2. The apparatus of claim 1, wherein the management frame is a probe response frame, a beacon frame, a unicast action frame, a broadcast action frame, an operating mode notification frame, a channel switch announcement frame, or a (re) association response frame.

3. The apparatus of claim 1, wherein the non-legacy element comprises a first signaling field comprising a plurality of bits, and wherein each bit of the plurality of bits is configured to identify a corresponding subchannel of the first operating band.

4. The apparatus of claim 3, wherein the first operating band comprises at least the first subchannel and a second subchannel, wherein a first bit of the signaling field corresponds to the first subchannel, and a second bit of the signaling field corresponds to the second subchannel, and wherein the one or more processors are further configured to cause the apparatus to:
set the first bit of the signaling field to indicate the start of the puncturing event associated with the first subchannel; and
set the second bit of the signaling field to indicate an end of another puncturing event associated with the second subchannel.

5. The apparatus of claim 3, wherein the one or more processors are further configured to cause the apparatus to:
obtain signaling from a first STA of the one or more STAs via the first subchannel after the start of the puncturing event; and
in response to the obtained signaling, output for transmission the first signaling field to the first STA via a management frame.

6. The apparatus of claim 3, wherein a legacy element of the at least one management frame comprises a second signaling field comprising an integer value, and wherein the integer value is configured to indicate a time the puncturing event will start.

7. The apparatus of claim 6, wherein at least one of the first signaling field or the second signaling field is repeated in a plurality of transmissions prior to the puncturing event.

8. The apparatus of claim 7, wherein each of the plurality of transmissions is separated in time according to a periodic time interval or a dynamic time interval.

9. The apparatus of claim 6, wherein the integer value is further configured to indicate a countdown time to the start of the puncturing event.

10. The apparatus of claim 6, wherein satisfaction of an equality condition associated with the integer value indicates the start of the puncturing event.

11. The apparatus of claim 1, wherein the one or more processors are further configured to cause the apparatus to:
output, for transmission, another management frame to the one or more STAs in response to an end of the puncturing event associated with the first subchannel, wherein the other management frame omits the non-legacy element to notify the one or more STAs that the apparatus will resume outputting data for transmission via the first subchannel; and
resume outputting data for transmission to the one or more STAs via at least the first subchannel.

12. The apparatus of claim 1, wherein the management frame comprises a plurality of elements, and wherein one or more of the plurality of elements are non-legacy elements.

13. The apparatus of claim 1, further comprising a transceiver configured to transmit the data and the at least one management frame, wherein the apparatus is configured as an access point (AP).

14. An apparatus for wireless communications, comprising:
memory comprising instructions; and
one or more processors configured to execute the instructions and cause the apparatus to:
obtain, from an access point (AP) prior to a start of a puncturing event, at least one management frame comprising a non-legacy element configured to indicate the puncturing event and a first subchannel of a plurality of subchannels of a first operating band used by the apparatus for communication with the AP in a basic service set (BSS); and
refrain from outputting data for transmission to the AP via the first subchannel upon the start of the puncturing event.

15. The apparatus of claim 14, wherein the management frame is a probe response frame, a beacon frame, a unicast action frame, a broadcast action frame, an operating mode notification frame, a channel switch announcement frame, or a (re) association response frame.

16. The apparatus of claim 14, wherein the non-legacy element comprises a first signaling field comprising a plurality of bits, and wherein each bit of the plurality of bits is configured to identify a corresponding subchannel of the first operating band.

17. The apparatus of claim 16, wherein a legacy element of the at least one management frame comprises a second signaling field comprising an integer value, and wherein the integer value is configured to indicate a time the puncturing event will start.

18. The apparatus of claim 17, wherein the one or more processors are further configured to cause the apparatus to obtain, from the AP over the first subchannel, repeated transmissions of the first signaling field or the second signaling field prior to the puncturing event.

19. The apparatus of claim 18, wherein each of the plurality of transmissions is separated in time according to a periodic time interval or a dynamic time interval.

20. The apparatus of claim 17, wherein the non-legacy element comprises an integer value indicating a countdown to the start of the puncturing event.

21. The apparatus of claim 20, wherein satisfaction of an equality condition associated with the integer value indicates the start of the puncturing event.

22. The apparatus of claim 14, wherein the one or more processors are further configured to cause the apparatus to:
obtain, from the AP, another management frame omitting the non-legacy element; and
resume outputting data for transmission to the AP via at least the first subchannel.

23. The apparatus of claim 22, wherein the other management frame is configured to notify the apparatus that the AP will resume transmitting data via the first subchannel.

24. The apparatus of claim 14, wherein the management frame comprises a plurality of elements, and wherein one or more of the plurality of elements are non-legacy elements.

25. The apparatus of claim 14, wherein the one or more processors are further configured to cause the apparatus to:
obtain, from the AP after a start of another puncturing event, signaling comprising at least one of a physical (PHY) header or a medium access control (MAC) header, wherein the PHY header and the MAC header are configured to indicate the other puncturing event and a second subchannel of the plurality of subchannels; and
refrain from outputting data, via the second subchannel, for transmission to the AP in response to the signaling comprising at least one of the PHY header or the MAC header.

26. The apparatus of claim 14, wherein the plurality of subchannels include a second subchannel, and wherein the one or more processors are further configured to cause the apparatus to:

refrain from outputting data for transmission to the AP via the second subchannel in response to no valid signals from the AP being obtained via the second subchannel.

27. The apparatus of claim 14, further comprising a transceiver configured to receive the at least one management frame and refrain from transmitting the data, wherein the apparatus is configured as a station (STA).

28. An apparatus for wireless communications, comprising:

memory comprising instructions; and
one or more processors configured to execute the instructions and cause the apparatus to:
output, for transmission to one or more stations (STAs) via a first operating band prior to a switch from the first operating band to a second operating band, a first indication related to the switch from the first operating band to the second operating band;
switch to the second operating band;
output, for transmission to the one or more STAs via the second operating band after the switch, a trigger frame indicating uplink resources; and
obtain, from each of the one or more STAs via the second operating band, information indicating a second operating band capability of the corresponding one or more STAs, wherein the information indicating the second operating band capability is obtained via one or more probe request frames and via the uplink resources.

29. The apparatus of claim 28, wherein the first indication comprises a communication parameter indicative of a contention window (CW) duration.

30. The apparatus of claim 28, wherein the one or more processors are further configured to cause the apparatus to output, for transmission to the one or more STAs via the second operating band after the switch, a communication parameter indicative of a contention window (CW) duration.

31. The apparatus of claim 30, wherein the first indication comprises the communication parameter indicative of the contention window (CW) duration.

32. The apparatus of claim 28, wherein the uplink resources include at least one of a random access uplink resource or an assigned uplink resource.

33. The apparatus of claim 28, wherein the first indication comprises a communication parameter configured to prevent the one or more STAs from transmitting the information indicating the second operating band capability prior to transmission of the trigger frame.

34. The apparatus of claim 28, wherein the first indication is output for transmission via a non-legacy element of a management frame.

35. The apparatus of claim 28, further comprising a transceiver configured to transmit the first indication and obtain the information indicating the second operating band capability, wherein the apparatus is configured as an access point (AP).

36. An apparatus for wireless communications, comprising:

memory comprising instructions; and
one or more processors configured to execute the instructions and cause the apparatus to:
obtain, from an access point (AP) via a first operating band, a first indication related to a switch from the first operating band to a second operating band, the first operating band used by the apparatus for communication within a basic service set (BSS);
obtain, from the AP via the second operating band after the switch, a trigger frame indicating uplink resources; and
output, for transmission to the AP via the second operating band, information indicating a second operating band capability of the apparatus, wherein the information indicating the second operating band capability is output for transmission via a probe request frame and via the uplink resources.

37. The apparatus of claim 36, wherein the information indicating the second operating band capability of the apparatus is output for transmission after a backoff period having a duration based on one of a defined duration or a generation of a random duration.

38. The apparatus of claim 37, wherein the first indication comprises a management frame comprising the defined duration.

39. The apparatus of claim 36, wherein the first indication comprises a communication parameter indicative of a contention window (CW) duration.

40. The apparatus of claim 36, wherein the one or more processors are further configured to cause the apparatus to obtain, from the AP via the second operating band after the switch, a communication parameter indicative of a contention window (CW) duration.

41. The apparatus of claim 40, wherein the first indication comprises the communication parameter indicative of the contention window (CW) duration.

42. The apparatus of claim 36, wherein the uplink resources include one or more of a random access uplink resource or an assigned uplink resource.

43. The apparatus of claim 36, wherein the first indication comprises a communication parameter configured to prevent the apparatus from outputting for transmission the information indicating the second operating band capability prior to obtaining the trigger frame.

44. The apparatus of claim 43, wherein the information indicating the second operating band capability of the apparatus is output, for transmission to the AP via the second operating band, in response to the trigger frame.

45. The apparatus of claim 36, wherein the first indication is obtained via a management frame comprising a non-legacy element configured to indicate the switch from the first operating band to the second operating band.

46. The apparatus of claim 36, further comprising a transceiver configured to receive the first indication and transmit the information indicating the second operating band capability, wherein the apparatus is configured as a station (STA).

* * * * *